(12) United States Patent
TeGrotenhuis et al.

(10) Patent No.: US 7,344,576 B2
(45) Date of Patent: Mar. 18, 2008

(54) CONDITIONS FOR FLUID SEPARATIONS IN MICROCHANNELS, CAPILLARY-DRIVEN FLUID SEPARATIONS, AND LAMINATED DEVICES CAPABLE OF SEPARATING FLUIDS

(75) Inventors: Ward E. TeGrotenhuis, Kennewick, WA (US); Victoria S. Stenkamp, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 11/070,628

(22) Filed: Mar. 1, 2005

(65) Prior Publication Data

US 2005/0229553 A1 Oct. 20, 2005

Related U.S. Application Data

(63) Continuation of application No. 10/011,386, filed on Dec. 5, 2001, now Pat. No. 6,875,247, which is a continuation-in-part of application No. 09/588,871, filed on Jun. 6, 2000, now Pat. No. 6,666,909.

(51) Int. Cl.
*F02M 17/28* (2006.01)
(52) U.S. Cl. .......................... 55/319; 55/324; 55/423; 55/484; 95/52; 95/267; 95/268; 95/273; 95/286; 96/408; 96/414; 96/421; 165/60; 210/321.75; 210/321.84; 261/104; 261/110; 261/128; 261/154; 429/26; 429/37
(58) Field of Classification Search .................. 55/319, 55/324, 423, 484; 95/52, 267, 268, 273, 95/286; 96/408, 414, 421; 210/321.75, 210/321.84; 261/104, 110, 128, 154, 153; 429/26, 37; 165/60; 422/100, 189
See application file for complete search history.

(56) References Cited

U.S. PATENT DOCUMENTS

| 2,960,160 | A | | 11/1960 | Goodman et al. | |
| 3,168,137 | A | | 2/1965 | Smith | |
| 3,170,512 | A | | 2/1965 | Smith | |
| 3,289,752 | A | * | 12/1966 | Staub | 165/110 |
| 3,520,803 | A | * | 7/1970 | Iaconelli | 210/640 |

(Continued)

FOREIGN PATENT DOCUMENTS

BR PI 9702855-0 A 4/1999

(Continued)

OTHER PUBLICATIONS

"Studies on Two-Phase Flows at Normal and Microgravity Conditions," Balaktaiah et al., Isso-Institute for Space Systems Operations, 1996-1997, retrieved from internet on Mar. 14, 2003.

(Continued)

*Primary Examiner*—Duane Smith
*Assistant Examiner*—Minh-Chau T. Pham
(74) *Attorney, Agent, or Firm*—Derek Maughan; Frank Rosenberg

(57) ABSTRACT

Methods of separating fluids using capillary forces and/or improved conditions for are disclosed. The improved methods may include control of the ratio of gas and liquid Reynolds numbers relative to the Suratman number. Also disclosed are wick-containing, laminated devices that are capable of separating fluids.

20 Claims, 10 Drawing Sheets

U.S. PATENT DOCUMENTS

| | | | |
|---|---|---|---|
| 3,563,727 A | 2/1971 | Webb et al. | |
| 3,564,819 A | 2/1971 | Neulander et al. | |
| 3,587,730 A | 6/1971 | Milton | |
| 3,614,856 A | 10/1971 | Sanz et al. | |
| 3,619,986 A | 11/1971 | Mormont et al. | |
| 3,720,044 A * | 3/1973 | Grove et al. | 96/219 |
| 3,735,562 A | 5/1973 | Mousseau et al. | 96/6 |
| 3,797,202 A * | 3/1974 | Neulander et al. | 96/5 |
| 3,837,146 A | 9/1974 | Faure et al. | |
| 3,925,037 A * | 12/1975 | Ward et al. | 96/5 |
| 3,961,918 A * | 6/1976 | Johnson | 96/165 |
| 4,117,079 A | 9/1978 | Bellows | |
| 4,187,086 A * | 2/1980 | Walmet et al. | 95/44 |
| 4,239,728 A * | 12/1980 | Stenberg et al. | 422/46 |
| 4,715,436 A | 12/1987 | Takahashi et al. | |
| 4,758,385 A * | 7/1988 | Acker et al. | 261/153 |
| 4,770,238 A * | 9/1988 | Owen | 165/104.26 |
| 4,869,067 A | 9/1989 | Sears | |
| 4,903,761 A * | 2/1990 | Cima | 165/104.25 |
| 4,999,107 A * | 3/1991 | Guerif | 210/224 |
| 5,126,045 A * | 6/1992 | Kohlheb et al. | 210/321.85 |
| 5,225,080 A | 7/1993 | Karbachsch et al. | |
| 5,281,254 A | 1/1994 | Birbara et al. | |
| 5,453,223 A * | 9/1995 | Maisotsenko | 261/153 |
| 5,453,641 A | 9/1995 | Mundinger et al. | |
| 5,486,475 A | 1/1996 | Kramer et al. | |
| 5,576,147 A * | 11/1996 | Guckel et al. | 430/313 |
| 5,718,848 A * | 2/1998 | James | 261/128 |
| 5,775,410 A | 7/1998 | Ramm-Schmidt et al. | |
| 5,800,595 A | 9/1998 | Wright | |
| 5,919,284 A | 7/1999 | Perry, Jr. et al. | |
| 6,010,554 A | 1/2000 | Birmingham et al. | |
| 6,126,723 A | 10/2000 | Drost et al. | |
| 6,168,647 B1 | 1/2001 | Perry, Jr. et al. | |
| 6,171,374 B1 | 1/2001 | Barton et al. | |
| 6,238,464 B1 | 5/2001 | Dullien | |
| 6,258,154 B1 | 7/2001 | Berndt et al. | |
| 6,326,211 B1 | 12/2001 | Anderson et al. | |
| 6,332,913 B1 | 12/2001 | Breitschwerdt et al. | |
| 6,475,268 B2 | 11/2002 | Thornton | |
| 6,503,298 B1 | 1/2003 | Monzyk et al. | |
| 6,541,676 B1 | 4/2003 | Franz et al. | |
| 6,581,402 B2 * | 6/2003 | Maisotsenko et al. | 62/315 |
| 6,666,909 B1 | 12/2003 | TeGrotenhuis et al. | |
| 6,989,134 B2 * | 1/2006 | Tonkovich et al. | 422/189 |
| 2001/0042716 A1 | 11/2001 | Iversen et al. | |
| 2002/0092767 A1* | 7/2002 | Bjornson et al. | 204/451 |
| 2002/0144600 A1 | 10/2002 | TeGrotenhuis et al. | |
| 2002/0164465 A1* | 11/2002 | Curro et al. | 428/198 |
| 2003/0033932 A1 | 2/2003 | Sirkar et al. | |
| 2004/0061245 A1* | 4/2004 | Maisotsenko et al. | 261/153 |
| 2005/0239910 A1* | 10/2005 | Jarosch et al. | 518/726 |
| 2005/0244304 A1* | 11/2005 | Tonkovich et al. | 422/100 |

FOREIGN PATENT DOCUMENTS

WO     WO 98/58743     12/1998

OTHER PUBLICATIONS

PCT Search Report, mailed Mar. 31, 2003, PCT/US 02/38577.

TeGrotenhuis et al., "Testing of a Microchannel Partial Condenser and Phase Separator in Reduced Gravity," First International Conference on Microchannels and Minichannels, Rochester, NY (Apr. 24-25, 2003).

* cited by examiner

- ▨ – Regions cut all the way through the shim
- ⊠ – Regions cut all the way through containing wick structure
- ☐ – Partially cut through the shim
- ▧ – Lands in flow path (not cut)

US 7,344,576 B2

CONDITIONS FOR FLUID SEPARATIONS IN MICROCHANNELS, CAPILLARY-DRIVEN FLUID SEPARATIONS, AND LAMINATED DEVICES CAPABLE OF SEPARATING FLUIDS

RELATED APPLICATIONS

This is a Continuation of U.S. patent application Ser. No. 10/011,386, filed Dec. 5, 2001, now U.S. Pat. No. 6,875,247, which was a Continuation-In-Part of U.S. patent application Ser. No. 09/588,871, filed Jun. 6, 2000, now U.S. Pat. No. 6,666,909, both of which are incorporated herein by reference as if reproduced below in full.

This invention was made with Government support under Contract DE-AC0676RLO1830 awarded by the U.S. Department of Energy. The Government has certain rights in the invention.

FIELD OF THE INVENTION

The present invention relates to methods of separating fluids using capillary forces and/or improved conditions for separating fluids. The invention also relates to wick-containing, laminated devices that are capable of separating fluids.

INTRODUCTION

Phase separation technologies involve processing a multiphase fluid stream, which can involve very complex flow behaviors. Two-phase flow can take many different forms, including bubbly flow, slug flow, churn flow, annular flow, and stratified flow, depending on the particular flow regime as established by the relative flow rates, fluid properties, and forces at play. See Carey, V. P., *Liquid-Vapor Phase-Change Phenomena*, Hemisphere Pub. Corp., Washington, 1992.

A great deal of work has been performed on establishing flow maps to predict flow transitions for two-phase flow in various geometries, and seven to nine dimensionless groups have been identified as potentially important. See Mandhane, J. M., G. A. Gregory, and K. Aziz, "Flow Pattern Map for Gas-Liquid Flow in Horizontal Pipes", Int. J. Multiphase Flow, 1, 537-553, 1974. Taitel, Y. and A. E. Dukler, "A Model for Predicting Flow Regime Transitions in Horizontal and Near Horizontal Gas-Liquid Flow", AIChE J., 22, 47-55, 1976. Jayawardena, S., V. Balakotaiah, and L. C. Witte, "Flow Pattern Transition Maps for Microgravity Two-Phase Flows", AIChE J., 43(6), 1637-1640, 1997.

In the invention described herein, preferred embodiments utilize capillary action to separate or maintain separation of phases. One known technology where capillary flow is used to motivate fluid flow is heat pipes. In a heat pipe, a liquid is evaporated at one end of the device, the evaporator end; flows as a gas to the other end; condenses back to a liquid; and flows as a liquid by capillary action back to the evaporator end. A wicking structure is generally used to promote gradients in the gas-liquid interface to induce capillary flow. This technology accomplishes much higher heat fluxes than is achievable by simple conduction for a given temperature difference. However, the purpose of heat pipe technology is heat transfer and not mass transfer between phases.

Intimate contacting of two or more immiscible phases in microchannels for the purpose of accomplishing mass transfer has been demonstrated by Pacific Northwest National Laboratories and others. However, the approach used for inducing flow of the fluids has been by pressure head and not by capillary flow. Capillary forces have been employed in these devices to prevent mixing of the fluids, such as with a contactor plate, membrane, or by small gaps, but not for motivating fluid flow.

SUMMARY OF THE INVENTION

Capillary driven flow can be used to move liquids in processes involving gases and liquids. Capillary driven flow is defined as flow induced by gradients in temperature, composition or curvature along a gas-liquid or liquid-liquid interface. The resulting contacting of fluids would presumably be for the purpose of mass transfer between the two phases, such as in operations including but not limited to distillation, gas absorption, stripping, and extraction. Capillary flow is easily accomplished at small dimensions, such as in microchannels. The relative direction of flow of the fluids can be either co-current or counter-current, with the latter being most often preferred. This concept differs from conventional technologies in the method of inducing flow. In conventional technologies, flow is normally motivated by other means, the most common being gravity (distillation, settlers), centrifugal forces (mechanical agitation), or by pressure (ejectors).

In one aspect, the invention provides a process of separating fluids in which a fluid mixture is passed into a microchannel of a separator device. The separator device includes a liquid outlet and a gas outlet. A wick and a gas channel are disposed within the microchannel. The fluid mixture includes a first component that is a liquid in the wick and a second component that remains a gas during the process. Conditions during the process are controlled such that the ratio of the gas to liquid Reynolds numbers, $Re_{GS}/Re_{LS}$, is greater than about $(4500) \cdot (Su)^{-0.67}$. The first component is removed through the liquid outlet; and the second component is removed through the gas outlet.

In a second aspect, the invention provides a laminated device capable of separating fluids. The laminate comprises at least two plates and at least one of the plates includes a fluid opening and at least one channel that includes an open area and a wick, where the open area is a contiguous open area adjacent the wick such that a gas can travel through the open area from the fluid opening to a gas exit. A liquid in the wick can travel to a liquid exit. A capture structure is disposed within the open area. The capture structure provides structural support for the laminate; for example by supporting a channel wall, compressing a pore throat, or compressing a gasket interposed between plates in the laminate.

In another aspect, the invention provides a method of separating two or more fluids. In this method, a first fluid passes into an inlet of a laminated device. The first fluid includes a first fluid component and a second fluid component. The laminated device includes at least two substantially planar layers, and a first fluid outlet and a second fluid outlet. The layers comprise a heat exchange layer and a separator layer; wherein the separator layer comprises a microchannel and a wick. Capillary force is the primary force used to move a liquid within the wick within the separator layer. A second fluid passes through the first fluid outlet and a third fluid passes through the second fluid outlet. The second fluid has a higher relative concentration of the first fluid component as compared to the concentration of the first fluid component in the first fluid and as compared to the concentration of the first fluid component in the third fluid. For the purposes of describing any aspect of the present invention, the phrase "substantially planar" refers to a channel or plate having dimensions of length and width that are at least 3 times greater than thickness. Length corresponds to the direction of fluid flow and thickness of a wick (for example) typically corresponds to the shortest distance through a wick from the open area to a channel wall. Length and width are perpendicular to each other. A tube is not substantially planar. Of course, interlocking features can be accommodated while maintaining substantial planarity.

In another aspect, the invention provides a method of separating components of a fluid, comprising: passing a first fluid comprising a first fluid component and a second fluid component into an inlet of a device comprising: a first fluid outlet, a second fluid outlet at least one channel; wherein the gas flows in one direction in the open area and the liquid flows in the wick substantially in the opposite direction (counter-flow); wherein the liquid is heated to form a gas in at least one portion of the device; wherein the gas is cooled to form a liquid in at least one other portion of the device; and passing a second fluid through the first fluid outlet and a third fluid through the second fluid outlet. The channel is substantially planar and includes an open area and a wick, where a gas flows through the open area and a liquid flows through the wick. The second fluid has a higher relative concentration of the first fluid component as compared to the concentration of the first fluid component in the first fluid and as compared to the concentration of the first fluid component in the third fluid.

In additional aspects, the invention provides a process and apparatus for separating fluids that are characterized by certain performance criteria. In these aspects, there is a separator device that includes a liquid outlet, a fluid opening, at least one channel and a gas outlet. The channel includes an open area and a wick. In these aspects the invention is characterized by certain performance criteria. For example, when tested by passing a fluid mixture containing 4.4% liquid water by volume in air into the fluid opening at a rate of 18.6 ml/s total flow per cc of open area, under the conditions of 25° C. temperature and atmospheric pressure, and where the inlet gas Reynolds number, $Re_{GS}$, is 400, the Reynolds number ratio, $Re_{GS}/Re_{LS}$, is 1.9, and the Suratmann number is 90000, at least 95%, more preferably at least 99%, of the liquid water is removed from the fluid mixture prior to exiting the gas outlet (or outlets) of the device, while the liquid water exits the liquid outlet (or outlets). In alternative embodiments, the testing conditions are changed such that there is 5 ml/s total flow per cc of open area for 9% water in air by volume; or 15 ml/s total flow per cc of open area for 4% water in air by volume; or 30 ml/s total flow per cc of open area for 1% water in air by volume. In an inventive process, a mixture including two immiscible fluids (i.e., having at least two phases), comprising a first fluid and a second fluid, passes into the fluid opening of the device. The first fluid is a liquid that is removed from the open area and sorbed by the wick, and the first fluid exits the device through the liquid exit. The second fluid is a gas, and the gas in the open area is contiguously connected to the gas exit. The gas travels to and exits from the gas exit. Preferably, a heat exchanger is thermally connected to the channel and, wherein, during at least a portion of the process, heat is exchanged between the heat exchanger and the channel. In some embodiments, the wicking capacity is no more than twice the flow rate of wetting fluid entering the open area.

Numerous properties and experimental results are disclosed in the description of preferred embodiments and Examples sections. Processes and apparatus of the invention can, alternatively or additionally, be characterized by the properties and results described.

The invention, in various aspects and embodiments can provide numerous advantages including: rapid mass transport, high rates of heat transfer, low cost, durability, highly efficient gas-liquid and chemical separations in a compact space, low profile equipment, and unit process operations that function in the absence of gravity, such as in extraterrestrial applications.

Applications for various embodiments of the inventive processes and apparatus include gas absorption, cryogenic separation of gases, stripping, and distillation. Distillation may include reactive distillation where a chemical reaction occurs in at least one of: the distillation channel, the wick, the open area, or a catalytic material added behind the wicking structure. Examples of reactions in reactive distillation include: hydrolysis, hydrogenation, dehydrogenation, esterification—including carboxylic acids with alcohols or alkenes such as for purifying lactic acid or acetic acid reactions, Fischer-Tropsch, and substitution reactions. The invention can provide advantages for conventional distillation by reducing the HETP (height equivalent of a theoretical plate) thereby reducing the number of stages stages required and/or the height of the column. Cryogenic separation includes separating air to produce relatively pure oxygen and nitrogen. The invention is particularly advantageous in applications where flow rates are small or where size matters, examples include: analytical systems, biological applications, waste stream purification, recovery and recycling such as urine in space applications.

Another application is a thermochemical compressor of a heat pump. If two components in the compressor have appreciable volatility, then purifying the gas stream coming from the desorber prior to the condenser can improve cycle efficiency. In preferred embodiments, a distillation column is inserted between the desorber and the condenser or integrated with the condenser.

GLOSSARY OF TERMS

"Breakthrough pressure" is the maximum pressure difference that can be maintained across a porous structure without having a wetting fluid displaced from the porous structure by a second fluid.

A "capture structure" is a structure disposed (at least partly) within a gas flow channel that assists movement of a liquid into the wick.

"Device volume" refers to the entire volume of the device, including channels, headers, and shims.

"Flow microchannel" refers to a microchannel through which a fluid flows during normal operation of an apparatus.

A "laminated device" is a device having at least two nonidentical layers, wherein these at least two nonidentical layers can perform a unit operation, such as heat transfer, condensation, etc., and where each of the two nonidentical layers are capable having a fluid flow through the layer. In the present invention, a laminated device is not a bundle of fibers in a fluid medium.

A "liquid" is a substance that is in the liquid phase within the wick under the relevant operating conditions.

"Microchannel" refers to a channel having at least one dimension of 5 mm or less. The length of a microchannel is defined as the furthest direction a fluid could flow, during normal operation, before hitting a wall. The width and depth are perpendicular to length, and to each other, and, in the illustrated embodiments, width is measured in the plane of a shim or layer.

"Microcomponent" is a component that, during operation, is part of a unit process operation and has a dimension that is 1 mm or less.

"Pore throat" refers to a porous structure having a maximum pore dimension such that a non-wetting fluid is restricted from displacing a wetting fluid contained with the pore throat under normal operating conditions.

"Residence time" refers to the time that a fluid occupies a given working volume.

"Unit process operation" refers to an operation in which the chemical or physical properties of a fluid stream are modified. Unit process operations (also called unit operations) may include modifications in a fluid stream's temperature, pressure or composition.

A "wicking region" is the volume occupied by a wick, or, a wicking surface such as a grooved microchannel surface.

"Working volume" refers to the total channel volume of the device, and excludes the headers and solid shim and end plate materials.

Dimensionless Groups

| | |
|---|---|
| $Bo = (\rho_L - \rho_G) g D_h^2 / \sigma$ | Bond number |
| $Ca = \mu_L U_{LS}/\sigma$ | Capillary number |
| $Re_{GS} = \rho_G U_{GS} D_h / \mu_G$ | gas phase Reynolds number based on gas superficial velocity |
| $Re_{LS} = \rho_L U_{LS} D_h / \mu_L$ | liquid phase Reynolds number based on liquid superficial velocity |
| $Su = \sigma D_h \rho_L / \mu_L$ | Suratman number |
| $We = \rho_L U_{LS}^2 D_h / \sigma$ | Weber number |

Symbols

| | |
|---|---|
| A | cross sectional area |
| g | acceleration due to gravity |
| $D_h$ | hydraulic diameter (based on channel cross section) |
| h | thickness of porous media |
| K | porous media permeability |
| Q | volumetric flow of fluid |
| $Q_{max}$ | maximum liquid flow rate without breakthrough |
| $Q_{pt}$ | maximum liquid flow capacity of the pore throat material |
| $r_p$ | maximum pore radius |
| $U_{LS}$ | liquid superficial velocity (based on air channel cross section and feed liquid flow) |
| $U_{GS}$ | gas phase superficial velocity (based on air channel cross section and feed gas flow) |

Greek Symbols

| | |
|---|---|
| $\Delta P$ | applied pressure difference across the pore throat |
| $\Delta P_{max}$ | maximum pressure difference that can be applied across the pore throat without gas intrusion |
| $\mu_G$ | gas dynamic viscosity |
| $\mu_L$ | liquid dynamic viscosity |
| $\theta$ | contact angle of liquid against solid |
| $\rho$ | density |
| $\rho_G$ | gas density |
| $\rho_L$ | liquid density |
| $\sigma$ | liquid surface tension |

DESCRIPTION OF PREFERRED EMBODIMENTS OF THE INVENTION

Figure 1:
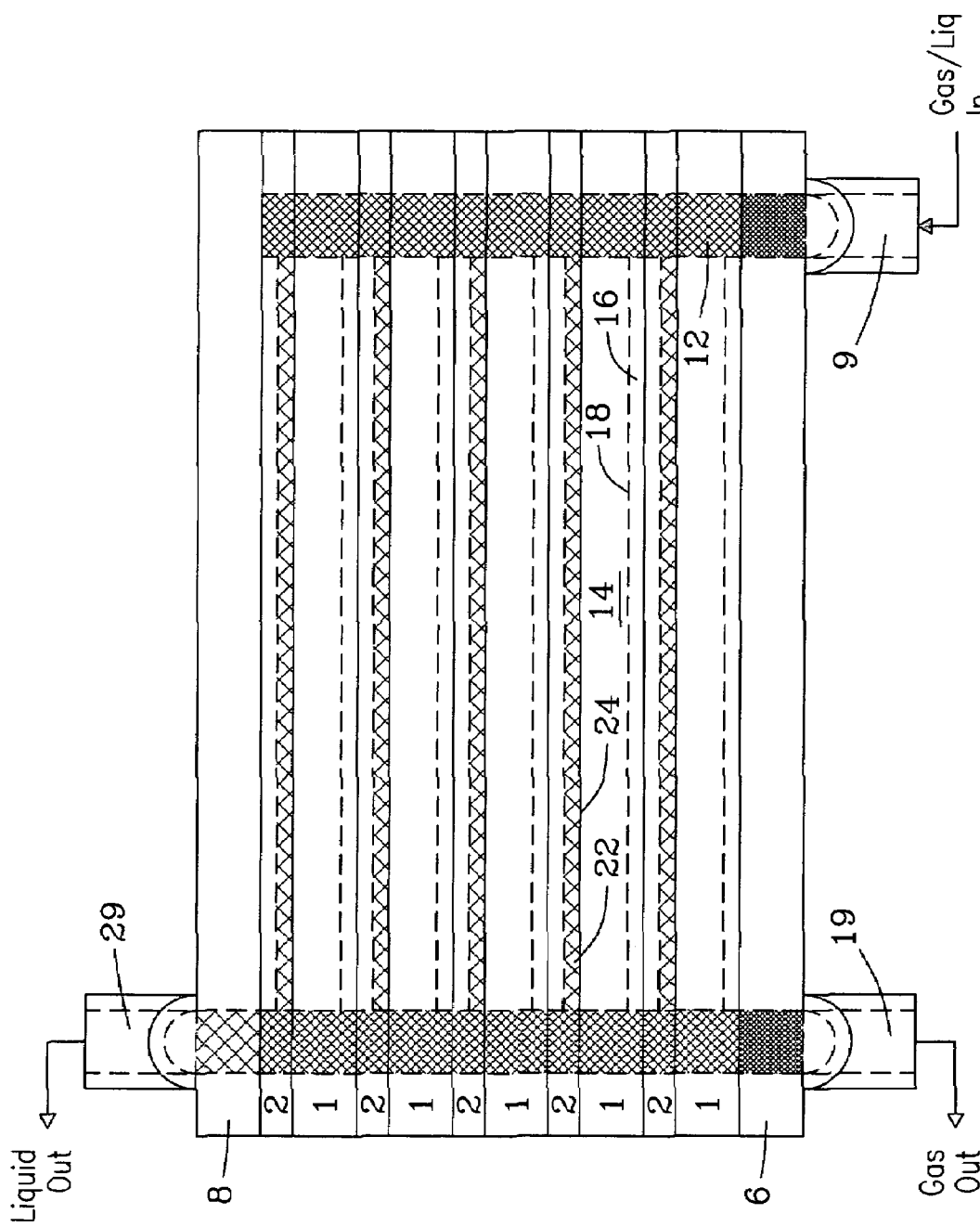
FIG. 1 is a cross-sectional view of a gas/liquid separator.

A preferred embodiment of a laminated gas/liquid separator is illustrated in FIGS. 1-5. An embodiment of such device is illustrated in FIG. 1. The illustrated device is made up of end plates 6, 8 and alternating central shims 1 and 2. A fluid inlet 9 is connected to open channel 12. Shim 1 has open gas flow channels 14. The surface 18 of solid section 16 forms the bottom of the gas flow channel. The top of the gas flow channel is formed by wick 22 of shim 2. As the gas/liquid mixture flows through channel 14, the liquid component is absorbed by the wick 22. The liquid in the wick travels to a wick exit channel and flows out through liquid outlet 29. To remove liquid suction can be applied through a pump (not shown). Gas flows out through a separate channel and out through gas outlet 19.

Figure 2:
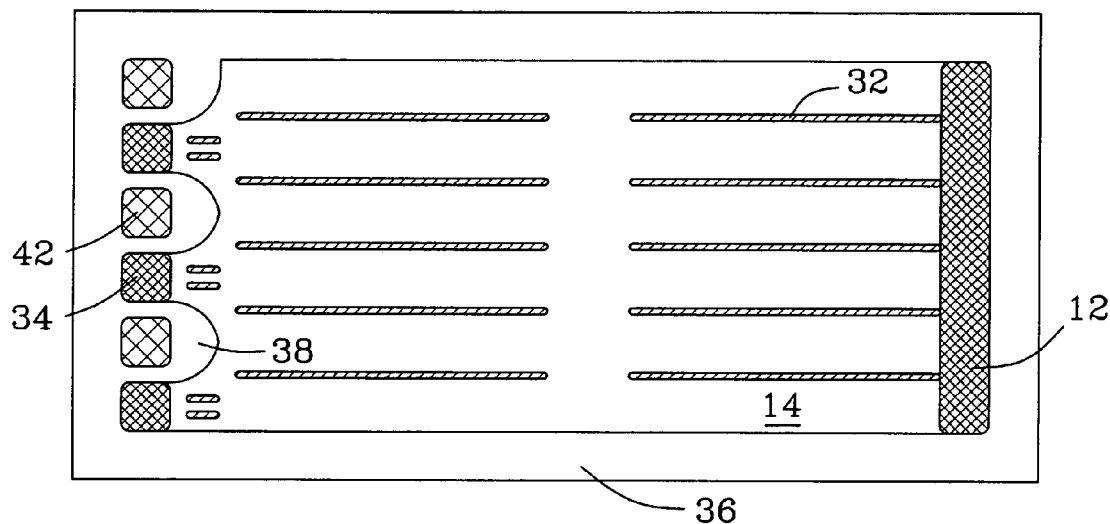
FIG. 2 is a top-down view of a gas flow channel layer of the gas/liquid separator.

A top down view of shim 1 is illustrated in FIG. 2. Channels 14 are separated by lands 32. The lands can support a wick insert and prevent channel collapse during fabrication. Gas flows through channels 14 and into gas exit holes 34. Lands 32 are preferably the same height as edges 36. The height of the gas flow channels 14, from surface 18 to wick surface 24 is preferably about 10 μm to 5 mm, more preferably 100 μm to 1 mm. The height of the channels is preferably small for good heat and mass transfer and overall device size, balanced against potentially slower flow rates. The path to exit wicks 42 can be blocked by lands 38. A high ratio of surface area of exposed wick to volume of gas flow channel is desirable for efficient phase separations. Preferably this ratio is from 1 to 1000 cm²:cm³, more preferably from 5 to 10.

Figure 3:
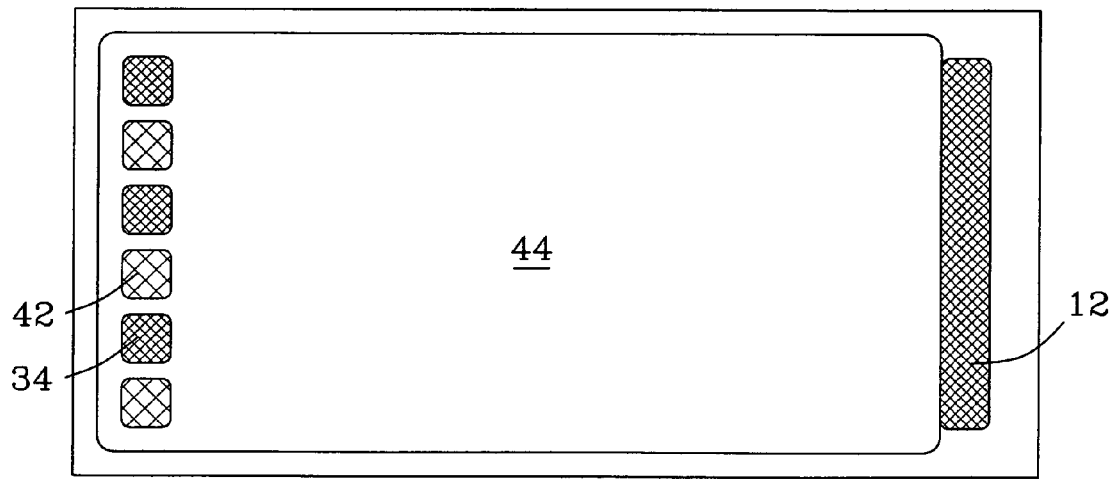
FIG. 3 is a bottom-up view of a liquid flow channel layer of the gas/liquid separator.

A bottom up view of shim 2 (without wick) is illustrated in FIG. 3. It includes gas exit holes 34 (open space) and exit wicks 42. A wick (not shown) may be inserted open space 42 (preferably without blocking hole 12). Alternatively, surface of the shim can be a wick structure such as microchannels. In any event, the wick structure should create a continuous liquid flow path with exit wick 42, but should not block gas exit holes 34.

Figure 4:
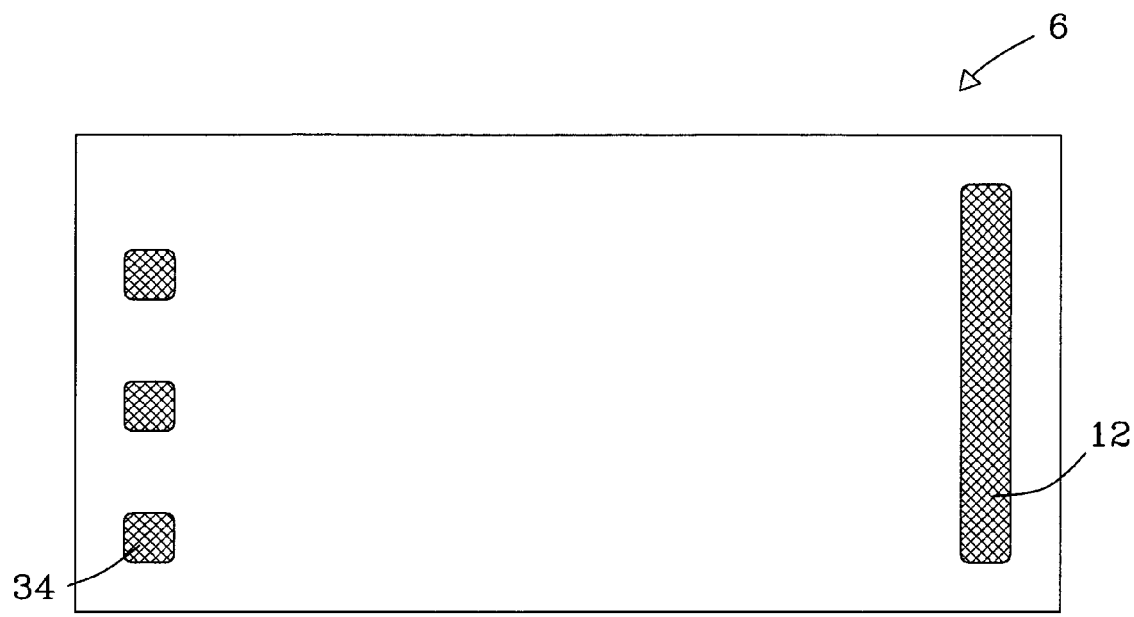
FIG. 4 is a top-down view of an end plate of the gas/liquid separator.
Figure 5:
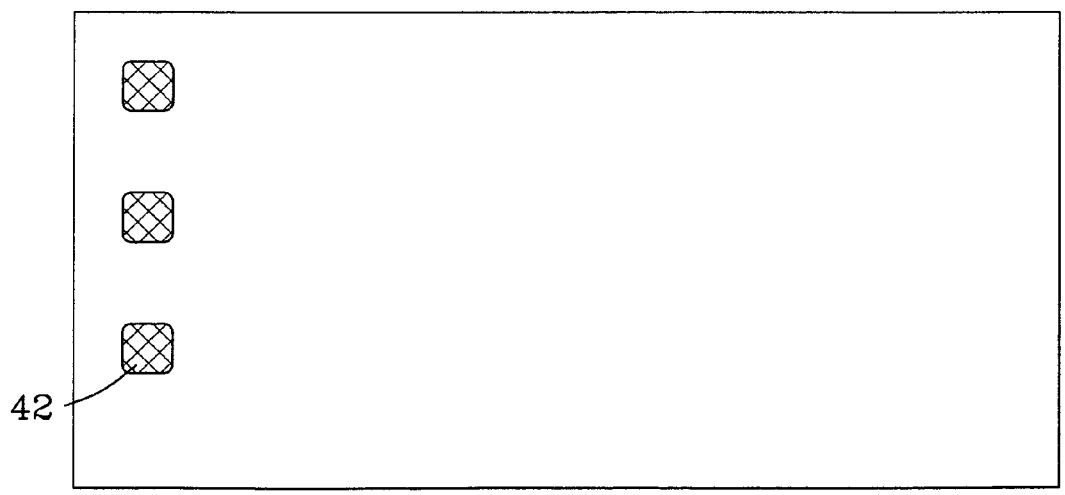
FIG. 5 illustrates the other end plate of the gas/liquid separator.

FIG. 4 illustrates a top down view of end plate 6 showing spaces for gas/liquid entry 12 and gas exit holes 34. FIG. 5 illustrates end plate 8 with exit wicks 42. Of course, the device could be plumbed to have gas and liquid exit from the same side or the gas/liq entry could be moved to the opposite end plate 8 to have liquid exit and gas/liq entry on the same side of the device.

In operation of a device with a wick, the wick should not be flooded, and it is preferably not dry. A wet or saturated wick will effectively transport liquid through capillary to a low pressure zone, such as low pressure created by suction. A pore throat may be added to liquid outlet 27 to prevent gas flow out of the liquid exit.

Figure 6:
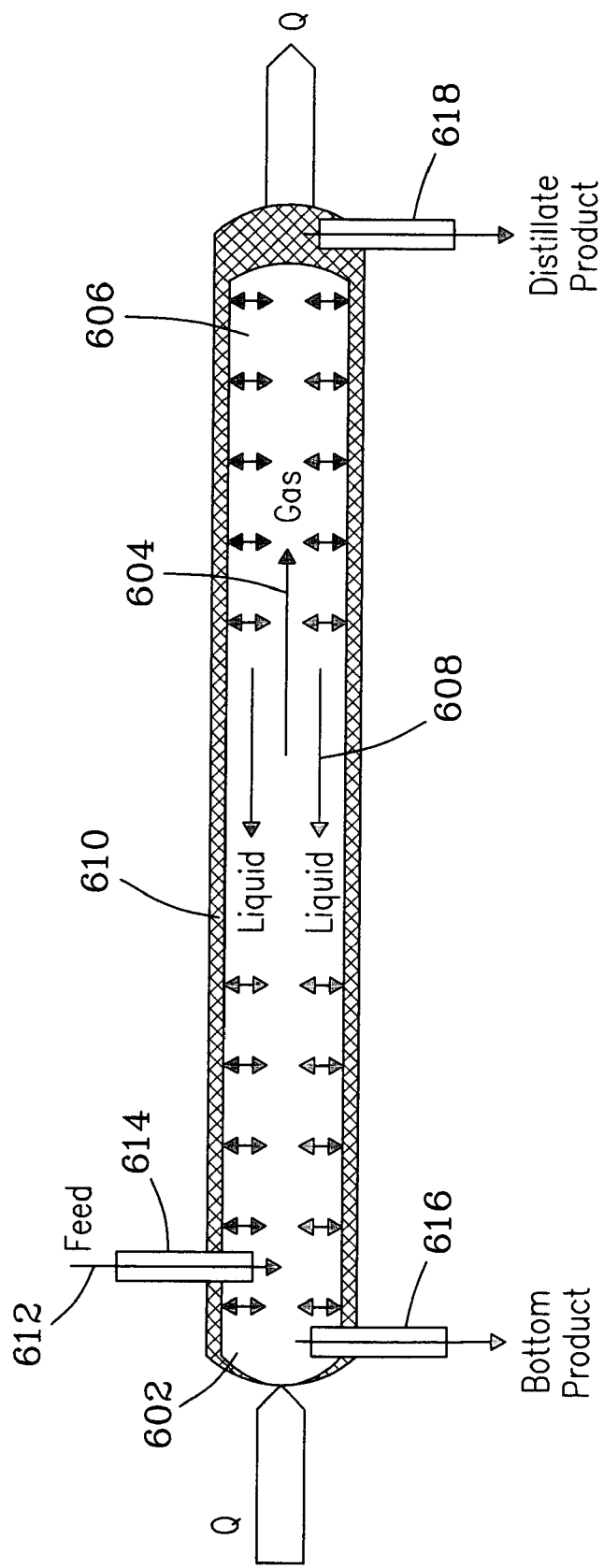
FIG. 6 is a schematic illustration of a concept for capillary distillation.

FIG. 6 illustrates the general concept that emulates the rectifying section of a distillation column. Heat is applied at the evaporator end 602, which is analogous to the reboiler in a distillation column, and the resulting vapor 604 flows to the opposite end 606, where it is condensed. The liquid 608 flows back to the evaporator end through a thin wick structure 610 by capillary flow. This recirculating action is identical to how heat pipes operate, and is analogous to the recirculating flow in a distillation column generated by reflux and reboiling. To operate the distillation device, the feed 612 contains a mixture of condensable components of varying volatility. The vapor generated at the evaporator end is enriched in the more volatile components according to Dalton's Law. In addition, the vapor flowing from the evaporating end to the condensing end contacts the liquid flowing in the opposite direction. The resulting mass transfer between the fluids allows the vapor stream to become more enriched in the more volatile components along the length of the device, while the liquid mixture becomes more enriched in the less volatile components in the opposite direction. By installing at least one inlet 614 and two outlets 616, 618 for a feed and two product streams, the device can be operated for continuous distillation.

Figure 7:
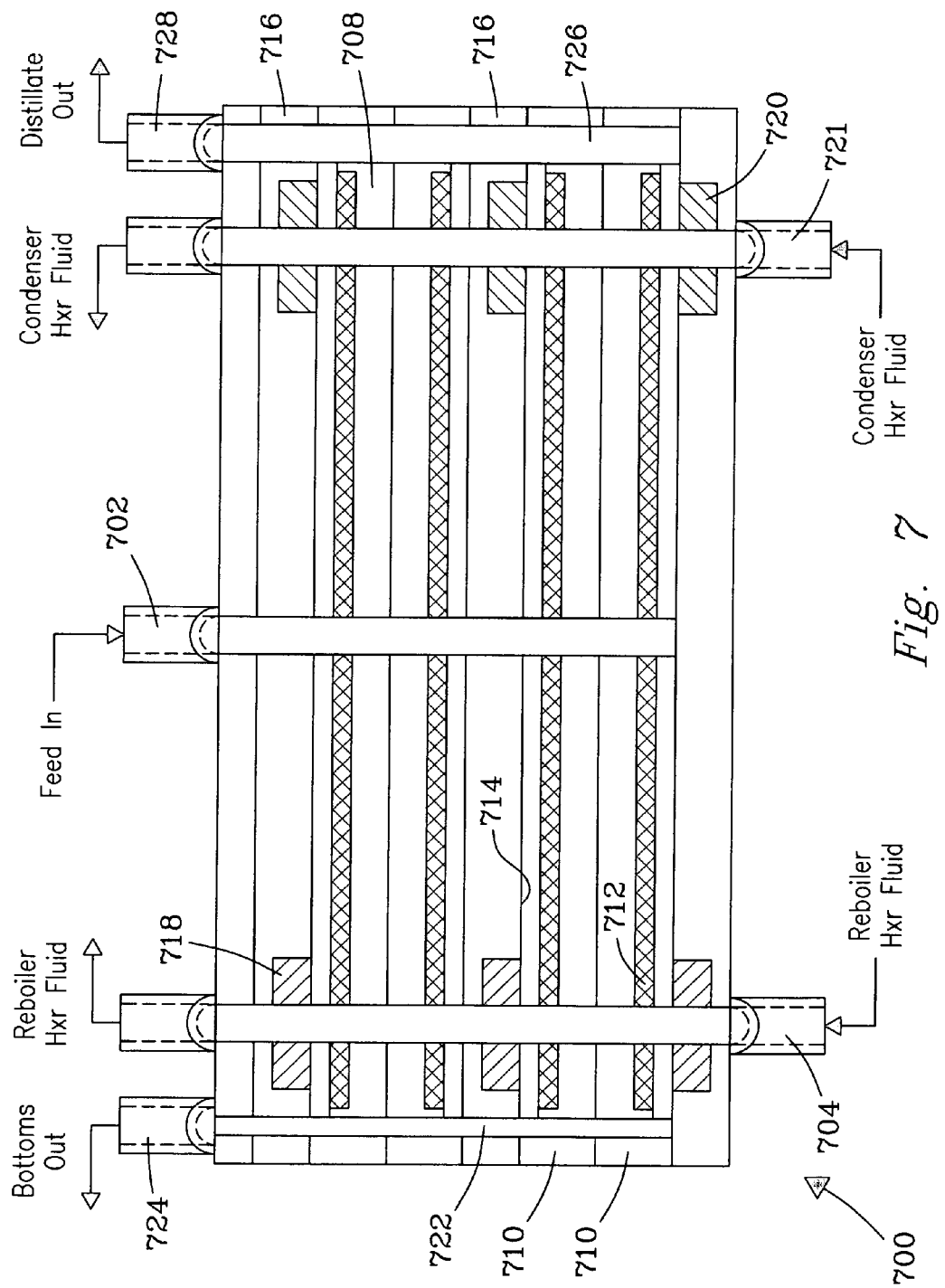
FIG. 7 is a cross-sectional view of a laminated, capillary distillation apparatus.
Figure 8:
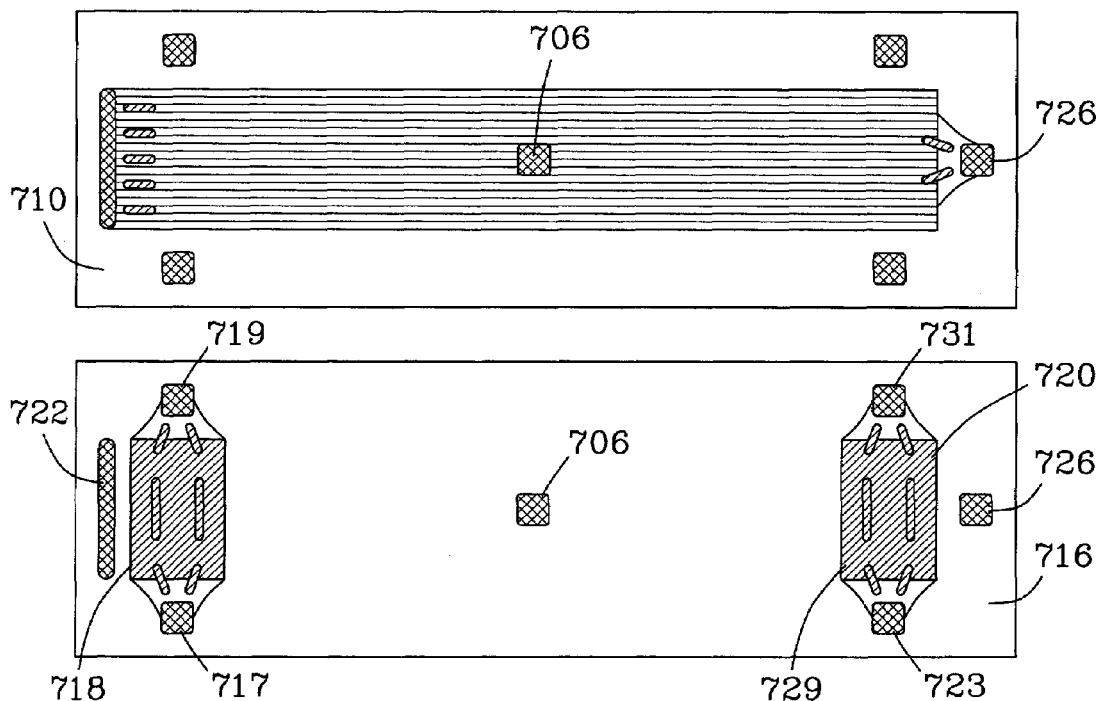
FIG. 8 is a top-down view of shims (plates) that can be used to construct a laminated, capillary distillation apparatus.
Figure 9:
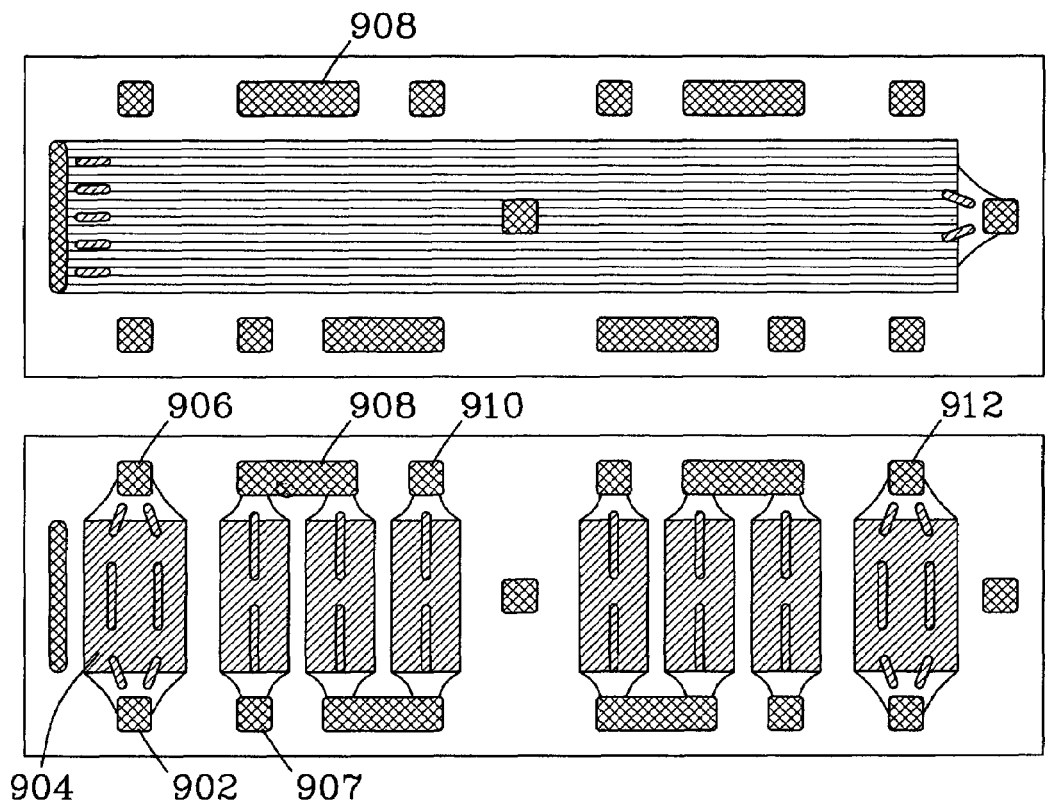
FIG. 9 is a top-down view of shims (plates) that can be used to construct a laminated, capillary distillation apparatus.

FIGS. 7-9 illustrate distillation apparatus 700. Overhead views of two embodiments of shims (plates) for distillation apparatus are shown in FIGS. 8-9. A cross-sectional view is shown in FIG. 7. Feed enters either as a gas, as a liquid, or as a mixture of a gas and liquid through feed inlet 702, into opening 706 and flows into the open gas flow channel 708 and wick 712. Optional capture structure within the gas flow channel is not shown in the figures, but, in a preferred embodiment, could be shown as a screen mesh. The gas flow channel 708 is formed by identical, face-to-face distillation shims 710. The illustrated distillation shims each contain wick 712 and channel wall 714. For rapid heat transfer, channel wall 714 is adjacent to a heat exchanger shim 716. Each heat exchanger shim 716 has heating channels 718 and cooling channels 720. During distillation, a fluid is vaporized in the region near the heating channels, then vapor travels through gas flow channel 708 toward the region near cooling channels 720 where at least a portion of the vapor condenses to form a liquid and moves through wick 712 to the region near the heating channel. The uncondensed vapor flows into openings 722 and out of the device through outlet 724. Alternatively, all of the vapor is condensed in the region near cooling channels 720 and a portion of the condensed liquid moves into openings 722 and out of the device through outlet 724. A portion of the vapor generated in the region of the heating channels 718 exits through the openings 726 and out of the device through outlet 728. More preferably, a portion of the liquid in wick 712 flows to the openings 726 and out of the device through outlet 728. A hot heat exchange fluid enters through heat exchanger inlet 704, in through opening 717, travels through channels 718—where it gives up heat to the fluid in the distillation shims, and out through opening 719. A cold heat exchange fluid enters through heat exchanger inlet 721, in through opening 723, travels through channels 729 where it receives heat from the fluid in the distillation shims, and out through opening 731. The device operates in a manner that the more volatile components in the feed entering through inlet 702 preferentially accumulate in the region of the cooling channels 720 and are enriched in the stream exiting outlet 724. The less volatile components in the feed entering through inlet 702 preferentially accumulate in the region of the heating channels 718 and are enriched in the stream exiting outlet 728.

A preferred heat exchanger configuration is illustrated in FIG. 9. In this configuration, the hottest fluid flows in through opening 906, travels through the heat exchange channels and out through opening 902 wherein the flow path leads to a header in an end plate (not shown), and then travels down through opening 907, through the heat exchanger channels and across to connecting header opening 908. The heat exchange fluid continues to travel in a zig-zag fashion through the heat exchange channels and out through opening 910. Coolant enters through opening 912 and travels in an analogous zig-zag fashion through the cooling channels. In this way, fluid is gradually heated and cooled, thus increasing thermodynamic efficiency.

The illustrated embodiments show multi-pass cross-flow heat exchange; however, in more preferred embodiments, the flow through the heat exchanger is rotated 90° (so that the heat exchange fluid flows in the direction opposite net fluid flow in the distillation shims) to obtain counter-current flow. As in all the devices described herein, the shims can be repeated for numerous layers, and, in some embodiments, the devices include 2 to 1000, or at least 4, repeating distillation/heat exchange units, where the repeating unit includes shims for distillation (including a wick and capability for fluid transport) and heat exchange.

The presence of wicks and optional pore throats and capture structures are common to multiple embodiments of the invention. A wick is a material that will preferentially retain a wetting fluid by capillary forces and through which there are multiple continuous channels through which liquids may travel by capillary flow. The channels can be regularly or irregularly shaped. Liquid will migrate through a dry wick, while liquid in a liquid-containing wick can be transported by applying a pressure differential, such as suction, to a part or parts of the wick. The capillary pore size in the wick can be selected based on the contact angle of the liquid and the intended pressure gradient in the device, and the surface tension of the liquid. Preferably, the pressure differential across the wick during operation should be less than the breakthrough pressure—the point at which gas will intrude into the wick displacing the liquid—this will exclude gas from the wick.

The liquid preferentially resides in the wick due to surface forces, i.e. wettability, and is held there by interfacial tension. The liquid prefers the wick to the gas channel and as long as there is capacity in the wick, liquid is removed from the gas stream and does not leave in the gas stream as long as there is a mechanism for the liquid in the gas to come in contact with the wick.

The wick can be made of different materials depending on the liquid that is intended to be transported through the wick. The wick could be a uniform material, a mixture of materials, a composite material, or a gradient material. For example, the wick could be graded by pore size or wettability to help drain liquid in a desired direction. Examples of wick materials suitable for use in the invention include: sintered metals, metal screens, metal foams, polymer fibers including cellulosic fibers, or other wetting, porous materials. The capillary pore sizes in the wick materials are preferably in the range of 10 nm to 1 mm, more preferably 100 nm to 0.1 mm, where these sizes are the largest pore diameters in the cross-section of a wick observed by scanning electron microscopy (SEM). In some preferred embodiments, the wick is, or includes, a microchannel structure. Liquid in the microchannels migrates by capillary flow. The microchannels can be of any length, preferably the microchannels have a depth of 1 to 1000 micrometers ($\mu m$), more preferably 10 to 500 $\mu m$. Preferably the microchannels have a width of 1 to 1000 $\mu m$, more preferably 10 to 100 $\mu m$. In a preferred embodiment, the microchannels are microgrooves, that is, having a constant or decreasing width from the top to the bottom of the groove. In another embodiment, the microchannels form the mouth to a larger diameter pore for liquid transport.

Flooding can result from exceeding the flow capacity of the device for wetting phase through the wick; the flow capacity is determined by the fluid properties, the pore structure of the wick, the cross-sectional area for flow, and the pressure drop in the wick in the direction of flow.

For wicking materials, the objective is to provide materials that have high permeability and small pore structure, in order to obtain high flow rates while also supporting a significant pressure drop down the wick (the maximum pressure drop decreases with increasing pore size). For devices where liquid phase mass transfer limits processing throughput, such as gas absorption and distillation, the thinness of the wick material is also critical for process intensification. Preferably the thickness of a wick is less than 500 micrometers ($\mu m$), more preferably less than 100 $\mu m$, and in some embodiments between 50 and 150 $\mu m$.

It has been discovered that punctured and punctured/expanded foils provide surprisingly superior results when used as wicks and/or capture structures in fluid separation apparatus. Particularly preferred foils are UltraThin Micro-Grid Precision-Expanded Foils, available from Delker Corporation. These materials are made in a flattened form and a 3-dimensional expanded form. Although similar to conventional wire mesh screens, these materials are made from a single thin sheet by punching an array of hole while pulling the material. In the flattened form the holes are an array of diamonds. In the expanded form, the filaments are in a regular tetrahedral configuration.

Both the flat and expanded foils have been tested for wicking properties as single sheets, in multiple stacked sheets, and with or without a solid backing sheet. In general, the wicking properties are much superior to other materials tested (except for Fresnel lenses, discussed below), including conventional woven screens. Qualitatively, the Delker foils appear to have an order of magnitude higher wicking rate than any other regular or random porous structure tested. In addition, the Delker materials can be made in a wide variety of thickness as small as 0.0015 inch (1.5 mil) and from a variety of metals, including copper, aluminum, and nickel. From these experiments it has been concluded that perforated foils, expecially perforated and expanded foils (or tetrahedrally configured filaments) demonstrate unexpectedly superior properties as wicks and capture structures.

Fresnel lenses are another preferred form of wick. For example, a Fresnel lens having saw tooth grooves having 120 micron openings that are 74 microns deep was tested for wicking properties. Wicking rate with water was too fast for quantitative measurement with available instruments. Qualitatively, the wicking properties are very promising. Thus, wicks having microchannels having depths of less that 100 $\mu m$, preferably 50 to 100 $\mu m$ promote rapid mass transfer in applications such as gas absorption and distillation.

A wick can also be prepared by laser machining grooves into a ceramic tape in the green state. Such wicks can be made, for example, with grooves less than 50 microns deep with openings less than 100 microns wide. These grooves are expected to have a rectangular shape. Ceramic wicks have a high surface energy, are chemically inert, and have high temperature stability. Another material option is intermetallics formed from two or more metals placed in intimate contact during a bonding process and which combine to form an alloy, compound, or metal solution. Preferred intermetallics will have properties very similar to the ceramic materials. The advantage of engineered structures is fine control of the length-scale for mass transfer in the liquid phase, which is desirable for mass transfer limited applications, such as gas absorption and distillation.

In preferred embodiments, a wicking/pore throat structure provides a flow path for a separated liquid phase. Two mechanisms are desirable for optimal device operation, a wicking mechanism and a mechanism for excluding gas. The wicking mechanism is accomplished by a porous structure that is wetting for the liquid in order to cause preferential sorption, while having high permeability to provide flow capacity to the outlet. The second mechanism prevents intrusion by the gas stream into the liquid outlet channel, and can be accomplished using a pore throat. The bubble point of the pore throat, as dictated by the maximum pore size, contact angle, and surface tension of the liquid, determines the maximum allowable pressure differential between the gas and liquid outlets. The wick and the pore throat can be embodied in the same component or structure if a suitable structure is available having a high enough wicking flow capacity and small enough pores to give a high enough bubble point. In devices having both a wick and a pore throat, the pore throat has a relatively greater resistance to fluid flow.

The wick is preferably not permitted to dry out during operation since this could result in gas escaping through the wick. One approach for avoiding dryout is to add a flow restrictor in capillary contact with the wick structure, such as a porous structure with a smaller pore size than the wick structure and limiting the magnitude of the suction pressure such that the non-wetting phase(s) cannot displace the wetting phase from the flow restrictor. This type of restrictor is also known as a pore throat. In preferred embodiments, a pore throat is provided between the wick and the liquid flow channel and/or at the liquid outlet. In some embodiments, the wick can have a small pore diameter such that serves to transport fluids from the gas channel and also prevents gas intrusion, thus serving the dual purpose of a wick and a pore throat.

A pore throat has a bubble point that is greater than the maximum pressure difference across the pore throat during operation. This precludes intrusion of gas into the pore throat due to capillary forces (surface tension, wettability, and contact angle dependent). The pore throat should seal the liquid exit, so there should be a seal around the pore throat or the pore throat should cover the exit in order to prevent gas from bypassing the pore throat. The pore throat is preferably very thin to maximize liquid flow through the pore throat at a give pressure drop across the pore throat. In some embodiments, the pore throat has a pore size that is less than half that of the wick and a thickness of 50% or less than the wick's thickness; and in some of these embodiments the pore throat has a pore size that is 20% or less that of the wick. Preferably, the pore throat is in capillary contact with the wicking material to prevent gas from being trapped between the wick and the pore throat and blocking the exit.

A capture structure can be inserted (at least partly) within the gas flow channel, and in liquid contact with the wick. The capture structure assists in removing (capturing) a liquid from the gas stream. One example of a capture structure are cones that protrude from the wick; liquid can condense on the cones and migrate into the wick—an example of this capture structure is shown in U.S. Pat. No. 3,289,752, incorporated herein by reference. Other capture structures include inverted cones, a liquid-nonwetting porous structure having a pore size gradient with pore sizes getting larger toward the wick, a liquid-wetting porous structure having a pore size gradient with pore sizes getting smaller toward the wick and fibers such as found in commercial demisters or filter media. Mechanisms for capturing dispersed liquid particles include impingement (due to flow around obstructions), Brownian capture (long residence time in high surface area structure), gravity, centrifugal forces (high curvature in flow), or incorporating fields, such as electrical or sonic fields, to induce aerosol particle motion relative to the flow field.

It has been discovered that capture structures can also be useful as a structural element. For example, a foam rubber gasket was used to seal the pore throat to prevent bypass of gas around the pore throat to the liquid outlet. A wire mesh screen was placed in the gas channel above the pore throat, so that when the device was bolted together, the screen provided a force against the pore throat such that it sealed against the rubber gasket on the back side and also created a seal between the rubber gasket and the opposite wall. One means of assembling a multi-channel microchannel device is to create a sandwich of alternating layers with gaskets providing seals. In this situation, a capture structure in the gas channels could be compressed to generate forces through the entire stack, thereby providing for the necessary seals.

Consider an example in which shims are stacked to include the following structure: liquid flow channel/pore throat and/or wick/gas flow channel/pore throat and/or wick/ liquid flow channel. Optionally, a gasket is placed around the edges of the liquid flow channel. Compressing the stack would place compressive force on the gas flow channel; a capture structure in the gas flow channel could take some of this compressive force.

A second new use for a capture structure is to enhance heat transfer. If the capture structure has a high thermal conductivity, it can act as an extended surface for heat transfer. This is advantageous where heat transfer is important, such as in condensation of at least some part of a gas stream being cooled. By being in thermal contact with the primary heat transfer area, the capture structure promotes heat removal from the flowing gas stream, which is then conducted to the primary area and subsequently to the heat transfer fluid. In addition, condensation can occur on the capture structure, and the heat of condensation can also conduct through the capture structure.

A second use for the perforated foils in the expanded form (tetrahedrally configured filaments) is as capture structures. Low flow resistance is a desirable attribute of a capture structure, and the open, regular structure of the Delker expanded screens has low pressure drop for convective flow. Permeability of two Delker expanded screens was measured. The first was an aluminum mesh (10 AL 16-125 P) having a thickness of about 0.040 inch, and the second was a copper mesh (5 Cu 14-125 P) about 0.020 inch thick. 2-inch pieces of the aluminum mesh were placed in a 0.040-inch deep channel and 2.125-inch pieces of the copper mesh were placed in a 0.020-inch deep channel. Because the openings are diamond shaped, the material was oriented both with the long axis parallel to flow and the short axis parallel to flow. Pressure drop across the screen was measured at different air flow rates, from which permeability was calculated. Flow rate of air ranged from 0.14 Lpm to 3.26 Lpm. Permeability increased monotonically from $6.5 \times 10^{-6}$ cm$^2$ to $1.1 \times 10^{-4}$ cm$^2$ with flow in the long-axis direction for the aluminum mesh and from $6.3 \times 10^{-6}$ cm$^2$ to $9.8 \times 10^{-6}$ cm$^2$ with flow in the short axis direction. For the copper mesh, permeability ranged from $4.4 \times 10^{-5}$ cm$^2$ to $1.2 \times 10^{-4}$ cm$^2$ with flow in the long-axis direction, and from $43.8 \times 10^{-5}$ cm$^2$ to $8.1 \times 10^{-5}$ cm$^2$. Permeability was consistently higher when the flow was oriented in the direction of long-axis of the diamond openings. In comparison, a conventional 20-mesh woven wire screen that is 0.040 inch thick has a permeability of about $1.7 \times 10^{-6}$ cm$^2$ (based on a stack of screen 3 layers or greater). Permeabilities of 200 and 100 mesh stainless steel screens that have been reported to be 0.5 and $1.5 \times 10^{-6}$ cm$^2$, respectively. Consequently, the Delker foils can have one to two orders of magnitude higher permeability than conventional woven screens. In addition, the aluminum, copper, and other metal forms would have relatively high thermal conductivity and also enhance heat transfer. Thus, tetrahedrally configured filaments provide a significant advantage as capture structures.

Many fluid separation processes require heat exchange. In some applications, it is desired to use a gas as the heat exchange fluid. In this case, the majority of the heat transfer resistance can be in the heat exchange channel. Furthermore, the application may be sensitive to the pressure drop of the heat exchange fluid. One example is water recovery from multiple streams in an automotive fuel processor for generating a hydrogen rich gas stream for use in a fuel cell. Ambient airflow provided by a blower or fan would be the most convenient heat exchange fluid. In this case, the pressure head provided by the blower or fan would be limited. For applications such as these, a configuration with extended heat transfer surface in the heat exchange channels would be a preferred approach.

Figure 10:
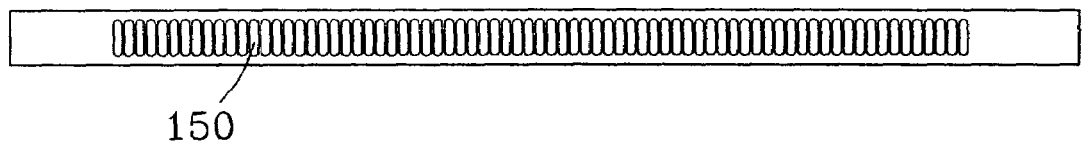
FIG. 10 illustrates elongated channel walls in a heat exchanger.

FIG. 10 shows a schematic of a heat exchange layer having extended heat transfer surfaces. This layer could be inserted, for example, in any of the devices described herein. For example, a hot humidified stream could enter a device through a header, distribute into parallel microchannels containing wicking structures, and cool. As the hot stream cools at least part of the stream would form a liquid and be separated from the gas stream. The gas and liquid fractions would exit the device through different outlets. At the same time, a coolant air stream would enter through the array of slots 150 in the heat exchanger. The pressure drop for the coolant air stream could be kept small by keeping the flow length short and/or by appropriate design of the number and aspect ratio of the slots. The primary heat transfer surfaces are the walls between the coolant flow slots and the open gas flow channels. The walls between the coolant flow slots, which act as heat exchange fins, provide extended heat transfer surface area. The walls between the slots also provide structural support. The optimal aspect ratio for the slots and the thickness of the walls between the slots depend on the thermal conductivity of the material and the convective heat transfer coefficient on the coolant side. In some preferred embodiments, channels for fluid flow in the heat exchanger have a wall thickness between slots of less than 20 μm, and preferably, a channel width of 15 to 50 μm, and a preferred ratio of channel height (the direction from the top to the bottom of FIG. 10) to channel width of at least 2, more preferably at least 4.

A factor that may limit the throughput of the devices is the flow capacity of the wicking and pore throat structure. This porous structure is characterized by a permeability coefficient defined as, $$K = \frac{\mu_L h Q}{A \Delta P} \quad (1)$$

where Q is the volumetric flow of fluid through the cross-sectional area A, of a porous media of thickness h, under an applied pressure drop of ΔP. The pore throat maximum liquid flow capacity, $Q_{pt}$, is then calculated for a given experiment from the viscosity of the liquid and the pressure difference across the pore throat structure. Device performance can then be characterized by the volumetric flow of recovered liquid as a percentage of the pore throat maximum flow capacity. Preferably, in the present invention, the volumetric flow of recovered liquid as a percentage of the pore throat maximum flow capacity is at least 30%, more preferably at least 70%.

Another potential limiting factor is intrusion of gas into the pore throat, which can occur at the bubble point of the pore throat, which is calculated from the Young-Laplace equation, $$\Delta P_{max} = \frac{2\sigma \cos(\theta)}{r_p} \quad (2)$$

where θ is the receding contact angle (meaning as the liquid is receding across the pore throat material) between the liquid and the pore throat and $r_p$ is the maximum pore radius.

Devices and processes of the present invention are capable of integrating high efficiency, high power density heat exchange. Heat exchange can facilitate phase changes within the separation device, such as condensation and evaporation. One example is partial condensation of a gas stream to recover condensable components, such as water from the cathode waste gas stream from a fuel cell. Another optional feature is reduced or non-wettability of the wall adjacent to a heat exchange surface to preclude formation of a liquid film. The heat transfer coefficient would increase substantially by avoiding the resistance of a liquid film.

In some preferred embodiments there are multiple gas flow channels operating in parallel. This configuration allows high throughput and provides a large surface area to volume ratio for high efficiency. In some preferred embodiments, layers are stacked to have between 2 and 600 separate gas flow channels, more preferably between 4 and 40 gas flow channels. As an alternative to the parallel arrangement, the channels could be connected in series to create a longer flow path.

Another advantage of some preferred embodiments of the invention is that the gas flow channels and/or liquid flow channels are essentially planar in the fluid separation regions. This configuration enables highly rapid and uniform rates of mass and heat transport. In some preferred embodiments, the gas flow channels and/or liquid flow channels have dimensions of width and length that are at least 10 times larger than the dimension of height (which is perpendicular to net gas flow). In especially preferred embodiments, the devices are made by stacking planar shims (plates) and bonding the stacked shims. Preferably, the shims are less than 1 cm thick, more preferably less than 5 mm thick.

Figure 11:
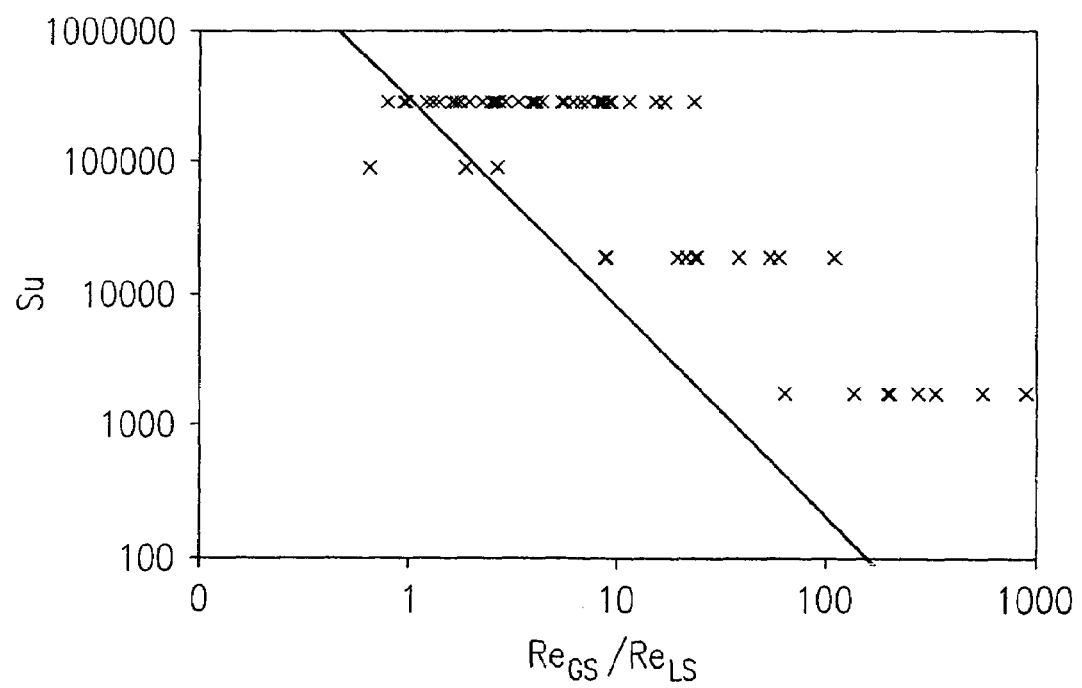
FIG. 11 is a plot of Suratmann number vs. $Re_{GS}/Re_{LS}$, where each (x) represents the breakthrough of water to the gas exit in numerous experiments in a single channel device; water breakthrough existing to the left of each (x) and the line represents the transition of slug to annular flow.

Microchannel phase separators have been tested over a wide range of gas and liquid flow rates, volume fraction of liquid, and with varying liquid phase properties. It was surprisingly discovered that the effectiveness at preventing breakthrough of liquid into the gas outlet was sensitive to two dimensionless parameters, the ratio of the gas and liquid Reynolds number and the Suratmann number. The Reynolds number for both phases is calculated based on the space velocity for the single phase. The Suratmann number is defined as $Su = \sigma D_h \rho_L / \mu_L$ with σ being the gas-liquid interfacial tension, $D_h$ being the hydraulic diameter, $\rho_L$ the liquid phase density, and $\mu_L$ the liquid phase viscosity. These two parameters have been identified in the literature as indicating where the transition from annular to slug flow occurs in pipe flow in microgravity, see Jayawardena, S., V. Batakotaiah, and L.C. Witte, "Flow Pattern Transition Maps for Microgravity Two-Phase Flows", AIChE J., 43(6), 1637-1640, 1997. FIG. 11 shows how the breakthrough of liquid from the gas outlet occurs in the same region of Reynolds number ratio for a given Suratmann number and how the breakthrough occurs at higher liquid flow rates with increasing Suratmann numbers. The spread is due to factors such as the pressure difference across the pore throat, which influences the pore throat capacity for liquid flow. The device would operate better in the annular flow regime than in a slug flow regime, because in annular flow the liquid would be forced to the corners and walls where it could then drain from the gas channel through the pore throat. However, this data provides a basis for preventing slug flow in a microchannel phase separator architecture. Conditions in the gas flow channel(s) are preferably maintained such that $Re_{GS}/Re_{LS}$ is greater than about $(4500) \cdot (Su)^{-0.67}$; and in some embodiments, the range of $Re_{GS}/Re_{LS}$ is in the range of $(4600$ to $10,0000) \cdot (Su)^{-0.67}$.

The data provides valuable insight into conditions for separations and for the design of microchannel devices for separating fluids. The results above can be extended to general design principles. In a preferred embodiment, a necessary condition for achieving separation of the phases is that the two phases must become continuous—the gas phase must be contiguously connected to the gas outlet and the liquid phase must be contiguously connected to the wicking structure—before the flow reaches the gas outlet. The continuity of phases at the gas outlet is effected by the geometry, the total flow and ratio of gas to liquid flow, and the fluid physical properties, as reflected by the dependence on $Re_{GS}/Re_{LS}$ and the Suratmann number described above. The second necessary condition is sufficient wicking capacity, which is influenced by the flow area, fluid physical properties, and the permeability of the material.

An inverse relationship has been discovered between the requirement for excess flow capacity in the wick and the establishment of continuous phases in the gas flow channel. As the flow moves through the gas flow channel, liquid is removed from the stream flowing in the gas flow channel. Therefore, $Re_{GS}/Re_{LS}$ is increasing down the gas flow channel. Therefore, even if the flow starts in a dispersed or broken flow regime, such as slug flow represented by those points to the left of the line in FIG. 11, the flow can become continuous (annular flow for example) as liquid is removed. However, the earlier that the two phases become continuous in the gas flow channel, the higher the fraction of wicking capacity that can be utilized. For a given gas and liquid flow rate, the size of the channel and the number of channels can be designed to achieve continuous phases (annular or stratified, as examples) in the flow in the channels as determined by the flow rates, the geometry, and the physical properties of the fluids, including consideration of the ratio of the Reynolds number and the value of the Suratmann number, while maximizing the throughput of the device. The data also show that surface tension and hydrodynamic forces dominate in two-phase microchannel flow over gravity forces.

EXAMPLES

Condensation experiments were conducted in a single-channel, microchannel device. A channel was constructed that was 0.040 inch (1 mm) deep×2 cm wide×8 cm long. A 2 cm×2 cm sintered metal pore throat was placed at one end. In one set of experiments, a piece of Novex LC2001 filter paper having a dry thickness of 0.017 inch was placed in the channel as a wick, and pieces of 2 cm×2 cm 20×20 mesh stainless steel screen (McMaster-Carr) and 2 cm×2 cm 60×60 mesh screen were placed over the pore throat area to provide for a compression seal of the pore throat. In a second set of experiments, the filter paper wick was not used, instead a piece of 2 cm×8 cm 60×60 mesh screen was placed on the side of the pore throat, and a piece of 2 cm×8 cm 20×20 mesh screen placed on top. In both experiments, the channel was closed by a 0.010-inch stainless steel shim. On the other side of the steel shim, water flowed through a 0.5 cm deep×2 cm wide×6.4 cm long channel to extract heat from the condensing side. In the first experiments, there was no capture structure in the gas channel, except over the pore throat area. The filter paper is a wick. In the second experiments, the fine screen (60×60 mesh) was intended to provide wicking which is promoted through the fine pore structure of the material. The coarser screen (20×20) was to promote liquid capture and enhanced heat transfer. The higher porosity of the coarse structure allows gas to flow through it, while still capturing liquid droplets. Enhanced heat transfer is created by two mechanisms: (1) conduction through the metal, which can act as fins, and (2) through movement of liquid away from the shim surface, thus reducing the thickness through which heat transfer must occur.

For the same coolant flow and temperature and the same inlet flow and composition, the second configuration provided better heat transfer. Although the hot stream inlet temperature was 12° C. cooler with the second configuration having the capture structure (119° C. versus 131° C.), the heat transfer effectiveness improved from 97.4% to 98.8%, the average Nuselt number increased from 29.3 to 33.7, and the overall heat transfer coefficient increased from 720 to 820 W/m².K. In most of these experiments, the heat transfer effectiveness was very high (>90%). It is expected that even more significant differences would be found at conditions of lower effectiveness. These experiments show the advantage of a capture structure, and the use of metal screens as a wick.

Another set of phase separation experiments were conducted in the single microchannel apparatus described as follows. The gas flow channel was 7.3 cm×1.4 cm×0.27 cm, while the adjacent liquid channel was 8 cm×2 cm×0.064 cm. The gas channel was open and did not contain a capture structure. Polymethyl methacrylate (Plexiglass™ or Lucite™) bounded one interior face of this channel while the pore throat of the liquid channel bounded the opposing face. The liquid channel consisted of Pall Supramesh™ Z (0.28 mm thick) overlying a 70-mesh stainless steel screen (0.36 mm thick). Pall Supramesh™ Z is comprised of sintered stainless steel bonded to a fine stainless steel mesh. The remaining interior faces of the device were polycarbonate. This configuration gives a large pore throat area, which increases capacity of liquid flow and does not employ a separate wicking structure per se, as the pore throat and wick are considered one. The device was tested while oriented horizontally to minimize the effects of gravity with the gas channel located above the liquid channel.

To measure pressure and temperature of the streams, thermocouples (Type K) and oil filled pressure transducers (Paroscientific model 2100A-102) were placed at the inlets and outlets of the device. The pressure transducers have an accuracy of ±0.01 psi. Both the pressure and temperature were measured at the entrance and gas outlet of the device. At the liquid outlet, only the temperature was measured, while the pressure was calculated. The pressure transducers were placed as close to the device as possible.

A mass flow controller and a peristaltic pump were used to supply the gas and liquids, respectively, through ⅛-inch tubing to a T-fitting where the phases were mixed.

The two-phase stream proceeded through additional ⅛-inch tubing, through thermocouple and pressure transducer fittings, and into the device through a 4.7 mm opening. The gas and liquid flow rates coming from the gas outlet were measured. As the flow exited the device through the gas outlet, it entered a flask for recovering any entrained liquids droplets then proceeded through a section of dessicant followed by a flowmeter, which was indicative of the total flow. The quantity of liquid exiting during a run was determined gravimetrically by placing the flask and drying agent on a scale. The flowrate of air was determined as the difference between the total and liquid flowrates. Calibrations were performed whereby the device was removed and known flowrates introduced to the quantification system. The results indicate that the measured flowrate of air is accurate to within 5%. Gas breakthrough from the liquid exit was monitored by feeding the liquid outlet stream into an inverted graduated cylinder filled with test liquid, and the total amount of entrained gas over a given period of time was measured by displacement. The time-average gas flow of entrained gas coming out of the liquid outlet was calculated. The flow rate of liquid coming out of the liquid outlet was typically calculated by difference, but was also measured independently in some cases.

The pressure difference across the pore throat is an important operating parameter. Its value was adjusted by controlling the siphon pressure at the liquid outlet. This was done by submerging the liquid discharge line into a bath of constant height and raising and lower the bath. Corrections were made for the backpressure created by the gas stream quantification system and the friction losses in the liquid discharge line. The pressure difference across the pore throat could be controlled very well when there was no breakthrough of liquid to the gas outlet. Once breakthrough occurred, the resulting two-phase flow in the gas outlet line and quantification system would cause an increase in back pressure. At this point, control of pressure difference across the pore throat became problematic and the height of the liquid discharge bath was no longer adjusted.

All experiments were performed with air as the gas phase. Four different liquids were used in order to vary the fluid properties, thereby altering dimensionless groups, including Bo, We, Ca, Su, and the viscosity ratio. In addition to water, 4 centipoise (cP) and 14 cP glycerin/water mixtures, and decane were used for the liquid phase. Properties and dimensionless groups are given for each of the liquids used in testing in Table A.2 of Appendix A.

The experiments were designed to explore the performance of a single-channel microchannel phase separator as a function of gas and liquid flow rates, the pressure difference across the pore throat, and liquid physical properties. A single configuration was tested that was designed to operate at relatively low liquid phase volume fraction, and was tested over the range from 0.05% up to 14%.

Figure 12:
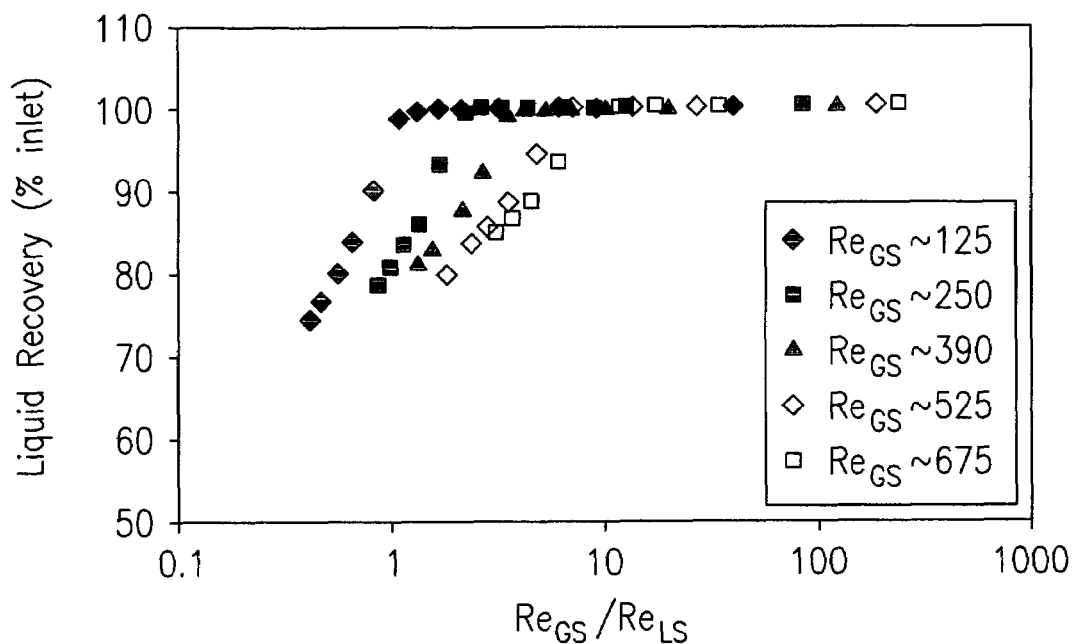
FIG. 12 is a plot of percent of feed water recovered from the liquid outlet as a function of $Re_{GS}/Re_{LS}$ with a target pressure difference of 12 inches water across the pore throat for gas Reynolds numbers of $Re_{GS}$~125 (♦), $Re_{GS}$~250 (■), $Re_{GS}$~390 (▲), $Re_{GS}$~525 (◊), $Re_{GS}$~675 (Δ).

Characterization of Breakthrough—An experimental series was run by varying the liquid flow rate, while keeping the gas flow rate and pressure difference across the pore throat relatively constant. Numerous series were run, varying both the gas flow rate and pressure drop. As soon as the liquid broke through to the gas outlet, the subsequent two-phase flow in the apparatus down stream of the gas outlet would cause large fluctuations in the backpressure to the device, making it problematic to control the pressure difference across the pore throat. FIG. 12 gives results for recovery of water at a target pressure difference of 12 inches of water column. Each set of symbols represents a constant gas volumetric flow (standard conditions). Liquid flow is increasing from right to left, and when the water recovery drops below 100%, the pressure difference across the pore throat increases due to the increasing backpressure on the gas outlet. As expected, at some critical liquid flow rate, breakthrough of water occurred at the air exit. The liquid flow rate at breakthrough decreases with increasing gas Reynolds number.

When 100% separation of the liquid from the gas stream occurred, the pressure drop from the inlet to the gas outlet was a fraction of an inch of water column even at the highest processing rates tested. The measured pressure drop was less than the accuracy that could be achieved with the pressure transducers. Once breakthrough of liquid into the gas outlet occurred, the subsequent two-phase flow down stream of the device caused backpressure fluctuations as high as 6-12 inches water column, which were much greater than the pressure drop across the device.

Observations were made of the flow behavior in the device. For a given gas flow rate and pressure difference across the pore throat, there was no discernible hold-up of liquid in the gas channel at low liquid flow rates. The small fraction of liquid would quickly sorb into the pore throat and be siphoned from the device. As the liquid flow rate was increased, liquid would begin to accumulate around the edges of the channels, at the entrance and along the sides. This accumulation would grow as the liquid flow was increased further, reducing the flow area for gas. Eventually, the shear forces at the gas liquid interface would be sufficient to cause entrainment of liquid into the gas leaving the device. For example, entrainment occurred at conditions of 130 mL/min of water flow, 1 SLPM air flow, and 12 inches of water pressure drop across the pore throat. During breakthrough, slugs of water could be seen to travel through the length of the gas channel.

Figure 13:
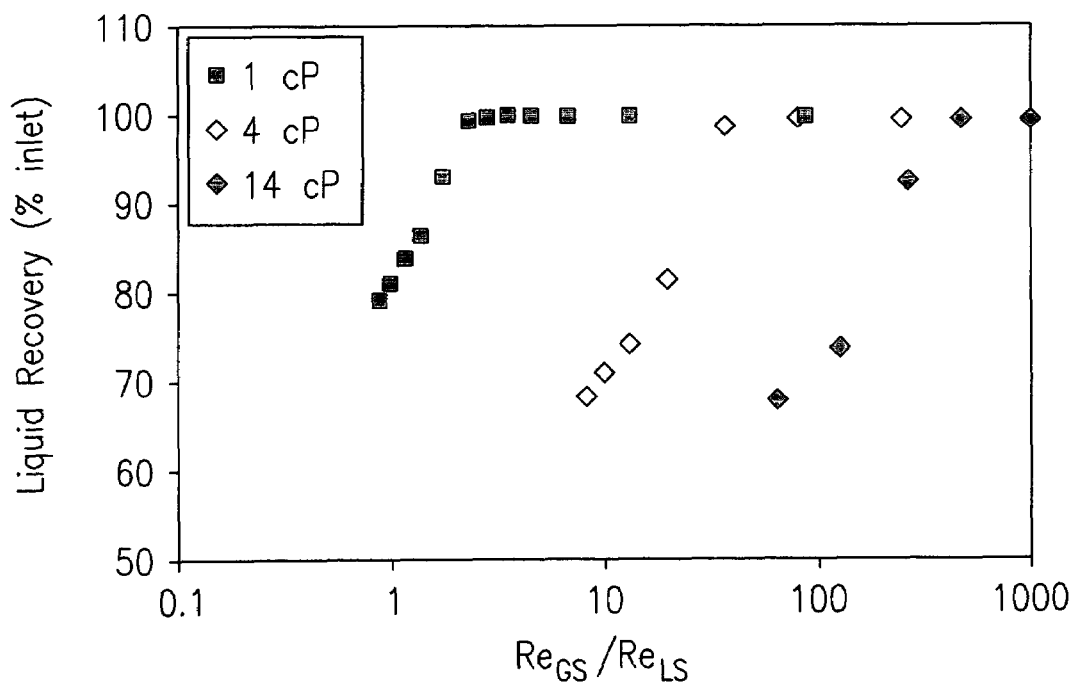
FIG. 13 is a plot of percent of feed water recovered from the liquid outlet as a function of $Re_{GS}/Re_{LS}$ with a target pressure difference of 12 inches water across the pore throat for liquid viscosities of 1 cP(■), 4 cP (◊), and 14 cP(♦).

The effect of viscosity was evaluated by testing the device with water (1 cP) and two glycerin-water mixtures (4 cP and 14 cP). Changing the viscosity was found to have a profound influence on the liquid recovery, as shown in FIG. 13 for the three liquids at constant gas Reynolds number. Increasing the viscosity decreases the maximum liquid flow rate that can be accommodated before breakthrough, thus shifting the point where the liquid capacity falls below 100% to the right on the graph.

Figure 14:
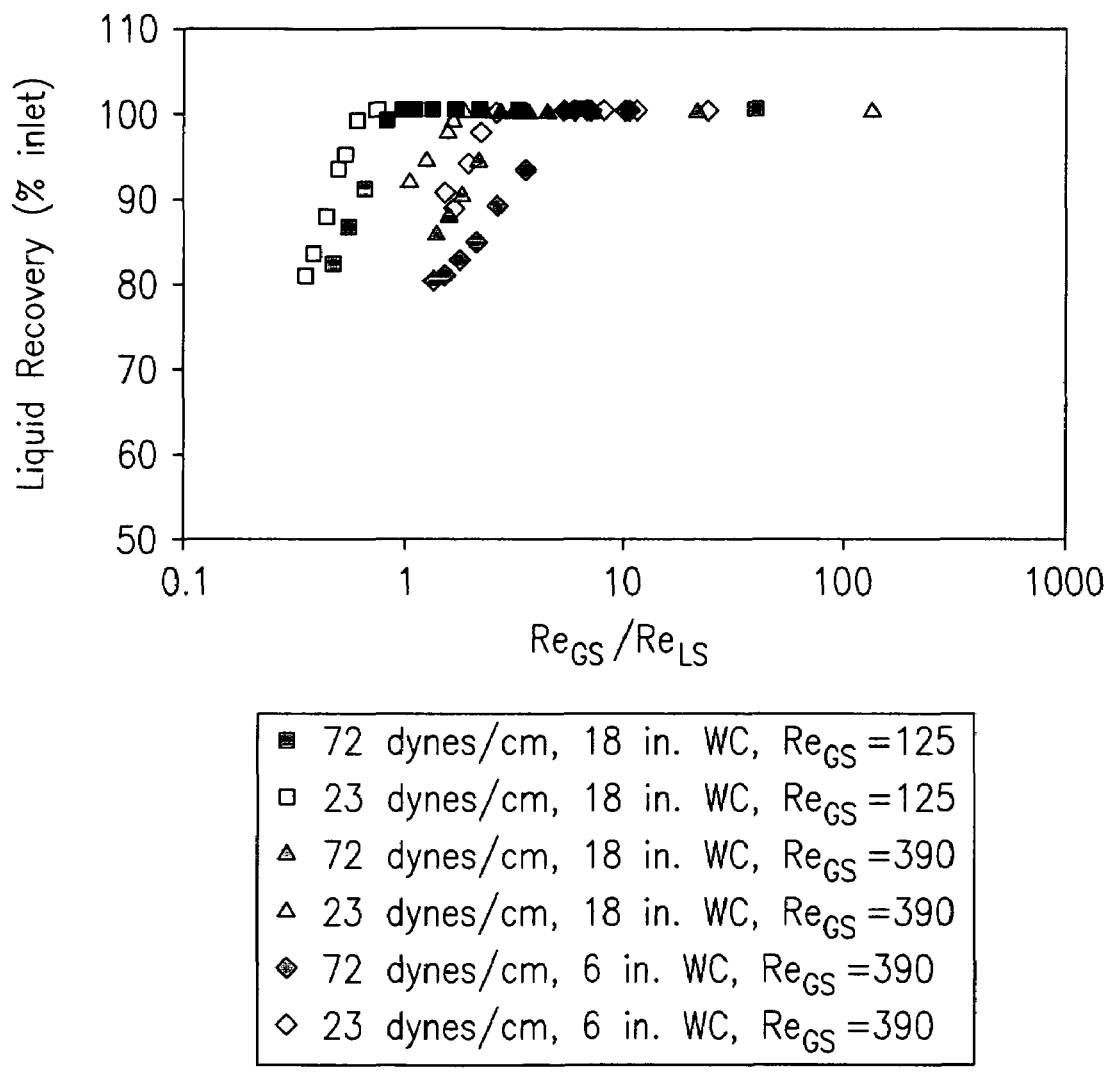
FIG. 14 is a plot of percent of feed water recovered from the liquid outlet as a function of $Re_{GS}/Re_{LS}$ at varying surface tensions and target pressure differences across the pore throat.

Changing the surface tension of the liquid had a much less profound effect than viscosity as shown in FIG. 14. Both decane ($\sigma=23$ dynes/cm) and water ($\sigma=72$ dynes/cm) were evaluated. In each case, the difference in performance is fairly similar, with breakthrough occurring at slightly higher liquid flow rates for decane, thus shifting these curves to the left of the water curves. The effect of surface tension becomes more pronounced at higher Reynold's numbers, suggesting increasing importance of hydrodynamic instabilities. FIG. 14 also illustrates that increasing the pressure drop across the pore throat increases the liquid capacity of the device, thus moving the curve to the left. This can be seen by comparing the curves for $Re_{GS}=390$ for both 6" (diamonds) and 18" (triangles) pressure drops across the pore throat. In all cases, gas breakthrough to the liquid outlet was minimal. Average gas flow from the liquid outlet did not exceed 1.4% of the feed gas flow. Theoretically, gas breakthrough should not occur until the bubble point pressure is exceeded. Bubble point is defined as the maximum pressure difference that can be sustained across the media without gas intruding through the media and displacing the media. The bubble point is calculated from the Young-Laplace equation (Equation 2), and is determined by the maximum pore size, surface tension, and the receding contact angle. The maximum pore size for Pall Supramesh Z material is estimated to be 15 micron in diameter, based on the reported 100% removal rating. Measured surface tensions and receding contact angles as well as the calculated bubble point pressure are given in Table 1 for the fluids tested. The intended pressure difference across the pore throat was kept below the bubble point in order to avoid gas intrusion. It was found that gas breakthrough can occur with water and glycerin-water solutions at approximately 50-60% of the bubble point pressure. In the majority of cases, breakthrough of gas in the liquid outlet occurs only when liquid breaks through to the gas outlet. The 6 to 12 inches of water pressure fluctuations that occur with liquid breakthrough can explain why gas breakthrough is seen at pressure differences significantly below the bubble point pressure. In the case of decane, breakthrough starts to occur at values close to the bubble point pressure. Decane is assumed to have a zero receding contact angle, which may over predict the bubble point. In addition, inaccuracies in the calculated bubble point pressure due to inaccuracies or variations in the contact angle or maximum pore size could account for the early breakthrough and the differences in behavior with decane versus the other liquids.

TABLE 1

Surface tension, receding contact angle, and theoretical bubble point of various fluids interacting with Pall Supramesh ® Z material.

| Fluid | Surface Tension σ (Dynes/cm) | Receding Contact Angle θ (degrees) | Theoretical bubble point (in. WC) |
|---|---|---|---|
| Water | 72 | 41 | 58 |
| 4 cP Glycerin/Water | 70 | 41 | 56 |
| 14 cP Glycerin/Water | 67 | 45 | 50 |
| Decane | 23 | 0 | 25 |

Correlation with Flow Regime and Dimensionless Parameters—Knowing which dimensionless groups (such as Ca, We, Su, Bo) affect the performance of the device, as well as knowing which groups have no discernible effect, provides insight into what forces and physical mechanisms are at work in making the device function as intended. To determine which dimensionless groups are important, the aforementioned groups can be correlated as a function of the device performance. One measure of the device performance is the maximum liquid flow rate that could be processed without breakthrough at a given gas flow and pressure difference across the pore throat. Instead of locating this point experimentally, this maximum liquid flow rate was calculated using linear regression of the water flow from the gas outlet versus the liquid feed flow in the region where breakthrough for the liquid is occurring. The intercept of the regression yields the calculated maximum liquid flow rate, $Q_{max}$. In actuality, a small amount of liquid breakthrough was observed at liquid flowrates lower than the calculated maximum. This is represented by a 'knee' in the liquid recovery versus $Re_{GS}/Re_{LS}$ curves, such as those shown in FIG. 12. It is observed that the region around the incipient breakthrough point is unstable, and it is presumed that small perturbations, such as those in pressure or flow, can yield an occasional loss of liquid out the gas outlet. Consequently, a design of a device for a given application may include a margin of over design to avoid this region of instability.

The maximum liquid flow rate is constrained by the capacity of the pore throat material, as represented by $Q_{pt}$ calculated from Equation 1. The permeability of the pore throat was determined from flow experiments where the gas channel of the separator device was filled with water at a constant head pressure and the liquid flow out of the liquid outlet was measured. Permeability was then calculated using Equation 1 at several pressures. From these results, a value of $1.8 \times 10^{-10}$ cm² was used as the permeability, K, in subsequent calculations of $Q_{pt}$.

A dimensionless measure of performance is the liquid recovery as a percentage of the pore throat capacity, calculated as $Q_{max}/Q_{pt}$. The maximum liquid flow rate, the pore throat capacity, and the percent ratio are summarized in Table A.1 for the various conditions and liquids tested, along with values for several dimensionless groups. The working volume of the test device used for producing the data in the table is 3.4 cc and the volume of the open area is 2.8 cc. Using the value of $Q_{max}/Q_{pt}$ provides a good comparison of all data, since it normalizes the strong effect of viscosity and pressure difference across the pore throat. For example, the values of $Q_{max}/Q_{pt}$ for water (1 cP) and the water/glycerin mixtures (4 cP and 14 cP) at conditions shown in FIG. 13 are 0.50, 0.74, and 0.72, respectively, which are comparable.

TABLE A.1

Summary of results for the maximum liquid flow rate as a percent of the maximum capacity of the pore throat for the given pressure difference across the pore throat along with values for potential meaningful dimensionless groups.

| Liquid[a] | $Re_{LS}$ | $Re_{GS}$ | $We_{LS}$ | Ca (×10⁵) | ΔP[b] (in. WC) | $Re_{GS}/Re_{LS}$ | $Q_{max}/Q_{pt}$[c] |
|---|---|---|---|---|---|---|---|
| Water | 95 | 130 | 0.032 | 34 | 7.8 | 1.4 | 72% |
| Water | 60 | 130 | 0.013 | 22 | 9.6 | 2.2 | 37% |
| Water | 100 | 270 | 0.036 | 36 | 7.4 | 2.6 | 80% |
| Water | 67 | 270 | 0.016 | 24 | 7.2 | 4.0 | 56% |
| Water | 51 | 410 | 0.009 | 18 | 6.9 | 8.1 | 43% |
| Water | 77 | 410 | 0.021 | 28 | 7.3 | 5.3 | 62% |
| Water | 76 | 550 | 0.021 | 27 | 6.0 | 7.2 | 75% |
| Water | 64 | 540 | 0.014 | 23 | 7.9 | 8.6 | 48% |
| Water | 45 | 700 | 0.007 | 16 | 5.6 | 16 | 47% |
| Water | 42 | 720 | 0.006 | 15 | 4.4 | 17 | 56% |
| Water | 110 | 130 | 0.042 | 39 | 11.6 | 1.2 | 55% |
| Water | 130 | 130 | 0.063 | 48 | 12.7 | 1.0 | 62% |
| Water | 110 | 270 | 0.044 | 40 | 12.3 | 2.4 | 53% |
| Water | 94 | 270 | 0.032 | 34 | 12.4 | 2.8 | 45% |
| Water | 110 | 410 | 0.041 | 38 | 12.3 | 3.9 | 51% |
| Water | 120 | 410 | 0.055 | 44 | 12.2 | 3.3 | 60% |
| Water | 80 | 550 | 0.024 | 29 | 12.1 | 6.7 | 40% |
| Water | 130 | 550 | 0.057 | 45 | 12.4 | 4.4 | 60% |
| Water | 76 | 700 | 0.020 | 27 | 11.8 | 9.3 | 38% |
| Water | 77 | 700 | 0.021 | 27 | 10.5 | 9.1 | 43% |
| Water | 140 | 130 | 0.070 | 50 | 17.0 | 0.9 | 49% |
| Water | 100 | 130 | 0.037 | 36 | 18.3 | 1.3 | 33% |
| Water | 110 | 270 | 0.040 | 38 | 18.6 | 2.5 | 33% |
| Water | 160 | 270 | 0.094 | 58 | 17.9 | 1.7 | 54% |
| Water | 140 | 420 | 0.074 | 51 | 18.0 | 2.9 | 47% |
| Water | 190 | 410 | 0.124 | 67 | 19.0 | 2.2 | 58% |
| Water | 90 | 550 | 0.029 | 32 | 17.6 | 6.2 | 30% |
| Water | 98 | 540 | 0.034 | 35 | 18.1 | 5.6 | 32% |
| Water | 150 | 560 | 0.079 | 53 | 18.7 | 3.7 | 47% |
| Water | 30 | 720 | 0.003 | 11 | 17.4 | 24 | 10% |

TABLE A.1-continued

Summary of results for the maximum liquid flow rate as a percent of the maximum capacity of the pore throat for the given pressure difference across the pore throat along with values for potential meaningful dimensionless groups.

| Liquid[a] | $Re_{LS}$ | $Re_{GS}$ | $We_{LS}$ | Ca (×10⁵) | $\Delta P$[b] (in. WC) | $Re_{GS}/Re_{LS}$ | $Q_{max}/Q_{pt}$[c] |
|---|---|---|---|---|---|---|---|
| Water | 60 | 700 | 0.013 | 22 | 17.9 | 12 | 20% |
| Water | 170 | 130 | 0.100 | 60 | 24.5 | 0.8 | 40% |
| Water | 82 | 130 | 0.024 | 29 | 24.4 | 1.6 | 20% |
| Water | 150 | 270 | 0.085 | 55 | 24.8 | 1.7 | 37% |
| Water | 180 | 410 | 0.120 | 65 | 25.3 | 2.2 | 43% |
| Water | 210 | 410 | 0.163 | 76 | 24.4 | 1.9 | 52% |
| Water | 160 | 550 | 0.096 | 59 | 24.6 | 3.4 | 39% |
| Water | 210 | 550 | 0.161 | 76 | 25.4 | 2.6 | 49% |
| Water | 160 | 710 | 0.093 | 58 | 23.1 | 4.4 | 41% |
| Water | 180 | 710 | 0.116 | 64 | 23.1 | 3.9 | 46% |
| 4 cP Gly | 4 | 420 | 0.001 | 20 | 8.2 | 113 | 39% |
| 4 cP Gly | 10 | 410 | 0.006 | 56 | 12.3 | 39 | 73% |
| 4 cP Gly | 14 | 130 | 0.011 | 78 | 19.5 | 9.0 | 64% |
| 4 cP Gly | 14 | 130 | 0.011 | 77 | 19.3 | 9.1 | 64% |
| 4 cP Gly | 13 | 270 | 0.009 | 70 | 19.5 | 20 | 58% |
| 4 cP Gly | 17 | 410 | 0.016 | 92 | 18.1 | 24 | 81% |
| 4 cP Gly | 10 | 550 | 0.006 | 54 | 20.6 | 55 | 42% |
| 4 cP Gly | 11 | 700 | 0.007 | 61 | 19.0 | 62 | 52% |
| 4 cP Gly | 17 | 410 | 0.016 | 93 | 24.4 | 24 | 61% |
| 4 cP Gly | 18 | 410 | 0.018 | 99 | 26.4 | 22 | 61% |
| 14 cP Gly | 0.4 | 410 | 0.00012 | 27 | 7.5 | 910 | 54% |
| 14 cP Gly | 1.2 | 400 | 0.00080 | 69 | 14.4 | 340 | 73% |
| 14 cP Gly | 2.0 | 130 | 0.00226 | 115 | 20.0 | 66 | 88% |
| 14 cP Gly | 1.9 | 260 | 0.00217 | 113 | 21.0 | 140 | 82% |
| 14 cP Gly | 2.0 | 410 | 0.00236 | 118 | 20.5 | 203 | 88% |
| 14 cP Gly | 1.9 | 530 | 0.00205 | 110 | 21.0 | 280 | 80% |
| 14 cP Gly | 1.2 | 700 | 0.00088 | 72 | 18.5 | 570 | 60% |
| 14 cP Gly | 2.0 | 400 | 0.00230 | 117 | 26.3 | 204 | 68% |
| Decane | 200 | 130 | 0.42746 | 75 | 18.8 | 0.7 | 61% |
| Decane | 220 | 400 | 0.52012 | 83 | 19.6 | 1.9 | 65% |
| Decane | 150 | 400 | 0.25484 | 58 | 9.9 | 2.7 | 90% |

[a]Physical properties and dimensionless groups for the liquids that were tested are shown in Table A.2.
[b]The pressure difference across the pore throat at the break through point.
[c]Calculated maximum flow of liquid without breakthrough of liquid to the gas outlet divided by the maximum flow capacity of the pore throat at the given $\Delta P$.

A series of analyses were performed looking for statistically significant relationships between dimensionless parameters and the device performance ($Q_{max}/Q_{pt}$). Several combinations of parameters were found to be statistically significant, but the combination that gave the highest probabilities for significance was $\ln(Re_{GS}/Re_{LS})$ together with ln(Su). Statistical least squares analysis gave greater than 99.99% probability that these two quantities in combination affect the performance of the device in influencing water breakthrough. The Bond number did not have a significant effect on performance in the particular configuration and orientation that was tested. This lack of correlation supports the conclusion that interfacial, capillary, and hydrodynamic forces rather than gravitational forces dominate two-phase flow in a microchannel. This lack of correlation occurs since the surface tension was observed to have only a minor affect on the liquid capacity.

The dependence on the Suratman number may be understood in the context of two-phase flow regimes. For the device to operate with complete separation, not only must fluid be transported through the pore throat, but in addition, mechanisms must exist to remove the liquid from the flowing gas and prevent the shear forces at the gas-liquid interface from entraining the liquid. Annular, stratified, and perhaps wavy flow would be expected to facilitate effective separation. Slug, bubbly, churn, or wispy annular flow patterns would allow entrainment and breakthrough of liquid to the gas outlet.

A summary of data for incipient breakthrough data for the microchannel gas-liquid separator is also shown in FIG. 11. A dependence on the Suratman number is found, which shows a decrease with the Reynolds number ratio. A transition from annular to slug flow is a contributing factor for causing incomplete separation. This correspondence is corroborated by visual observation. When incomplete separation occurs by breakthrough of liquid into the gas exit, slugs of water can often be seen traveling the length of the gas channel. When complete separation occurs, the liquid can at most occupy the edges of the device, as is the case in annular flow. Occupation of the upper surface is prevented by the presence of a relatively hydrophobic surface. At lower liquid flow rates, the device can be operated in any two-phase flow regime so long as the liquid is removed before the flow reaches the gas exit. For example, higher aspect ratio (thinner) channels have been tested which show good removal with intermittent two-phase flow, when the liquid is removed before the fluid reaches the gas exit.

TABLE A.2

Physical properties and dimensionless groups characterizing the liquids tested.

| Liquid | Density (g/cc) | Viscosity (cP) | Surface Tension (Dyne/cm) | $\mu_L/\mu_G$ | Bo | Su (×10$^{-3}$) |
|---|---|---|---|---|---|---|
| Water | 1.0 | 1 | 72 | 60 | 2.8 | 280 |
| 4 cP Gly | 1.09 | 4 | 70 | 240 | 3.1 | 19 |
| 14 cP Gly | 1.15 | 14 | 67 | 800 | 3.5 | 1.7 |
| Decane | 0.73 | 0.9 | 23 | 50 | 6.4 | 90 |

We claim:

1. A method of condensing a liquid, comprising:
passing a gaseous mixture into a fluid opening of a channel in a laminated device;
wherein the laminated device comprises a heat exchanger in thermal contact with the channel wherein the channel comprises an open area and a wick;
wherein the channel is defined by at least two channel walls;
removing heat from the channel into the heat exchanger and condensing a liquid in the channel;
wherein at least one channel wall defines a side of the open area, and wherein this wall comprises a surface that is nonwetting for the liquid; and
removing liquid from the channel.

2. The method of claim 1 wherein the wick comprises a microchannel structure in which microchannels form the mouth to a larger diameter pore.

3. The method of claim 1 wherein the wick has a thickness of less than 100 micrometers.

4. The method of claim 1 wherein the wick comprises an expanded foil.

5. The method of claim 1 wherein the wick comprises a Fresnel lens.

6. The method of claim 1 wherein the wick comprises microgrooves having depths of less than 50 micrometers and widths of less than 100 micrometers.

7. The method of claim 1 wherein the wick comprises an intermetallic.

8. The method of claim 1 wherein the channel further comprises a capture structure that assists in removing a liquid from the gaseous mixture.

9. The method of claim 8 wherein the capture structure comprises an expanded foil.

10. The method of claim 1 wherein the laminated device comprises stacked layers of channels and heat exchangers;
wherein, in the laminated device, the method is conducted in parallel in plural channels comprising an open area and a wick in contact with with plural heat exchangers.

11. The method of claim 10 wherein the channels comprising an open area and a wick are essentially planar.

12. The method of claim 11 wherein the channels comprising an open area and a wick have dimensions of width and length that are at least 10 times larger than the dimension of height.

13. A method of conducting a heterogeneous chemical reaction, comprising:
passing a fluid into a microchannel that comprises an open area, a wick, and, optionally, a capture structure;
wherein the wick or capture structure comprises an active catalytic material, or wherein an active catalyst material is disposed behind the wick with respect the to open area;
wherein the open area is a contiguous open area adjacent the wick; and
reacting the fluid in a heterogeneous reaction over the active catalytic material.

14. The method of claim 13 wherein the microchannel comprises a capture structure and wherein the capture structure comprises an active catalytic material, wherein the wick in the microchannel is connected to an exit wick; wherein the fluid comprises a gas, and further wherein the heterogeneous reaction comprises a heterogeneous gas phase reaction that forms a product that condenses into a liquid and is transported through the wick to the exit wick.

15. The method of claim 13 wherein the wick comprises an active catalytic material;
wherein the open area is connected to a gas exit; and
wherein the heterogeneous reaction occurs in the liquid phase in the wick.

16. The method of claim 15 wherein a gaseous product is formed in the heterogeneous reaction, and further wherein the gaseous product flows through the open area to the gas exit.

17. The method of claim 15 wherein the wick comprises a sintered metal, a metal screen, or a metal foam.

18. The method of claim 13 wherein the heterogeneous reaction comprises Fischer-Tropsch synthesis, wherein liquid hydrocarbons are formed and are transported through the wick.

19. The method of claim 13 wherein an active catalyst material is disposed behind the wick with respect the to open area.

20. The method of claim 1 wherein the a least one channel wall separates the open area from an adjacent heat exchange channel.

* * * * *